(12) United States Patent
Owashi

(10) Patent No.: US 8,238,735 B2
(45) Date of Patent: Aug. 7, 2012

(54) DRIVING MECHANISM AND OPTICAL EQUIPMENT

(75) Inventor: Masao Owashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 303 days.

(21) Appl. No.: 12/382,486

(22) Filed: Mar. 17, 2009

(65) Prior Publication Data

US 2009/0237792 A1    Sep. 24, 2009

(30) Foreign Application Priority Data

Mar. 19, 2008 (JP) ................. 2008-071862
Aug. 21, 2008 (JP) ................. 2008-212864
Aug. 21, 2008 (JP) ................. 2008-212894
Aug. 21, 2008 (JP) ................. 2008-212977

(51) Int. Cl.
*G03B 17/00* (2006.01)
*H04N 5/228* (2006.01)
*G02B 27/64* (2006.01)

(52) U.S. Cl. ............... 396/55; 348/208.7; 359/554

(58) Field of Classification Search ........... 396/55, 396/52; 348/208.99, 208.2, 208.7, 208.11; 359/554, 557
See application file for complete search history.

(56) References Cited

U.S. PATENT DOCUMENTS

| 7,379,092 B2 | 5/2008 | Seo | |
|---|---|---|---|
| 7,436,435 B2 | 10/2008 | Wada | |
| 2005/0185057 A1* | 8/2005 | Seo | 348/208.4 |

FOREIGN PATENT DOCUMENTS

| JP | 2003-110919 | 4/2003 |
|---|---|---|
| JP | 2005-241751 | 9/2005 |

* cited by examiner

*Primary Examiner* — Rochelle-Ann J Blackman
(74) *Attorney, Agent, or Firm* — Staas & Halsey LLP

(57) ABSTRACT

To provide a driving mechanism with which a reduction in size is possible. A driving mechanism comprising: an optical component that is provided to be movable; a first driving member that is movable in a first direction; a second driving member that is movable in the first direction independently of the first driving member; and an abutting portion that is provided at the optical component and abuts against the first driving member and the second driving member, wherein, the optical component is moved by driving force of the first driving member and the second driving member abutting against the abutting portion.

8 Claims, 37 Drawing Sheets

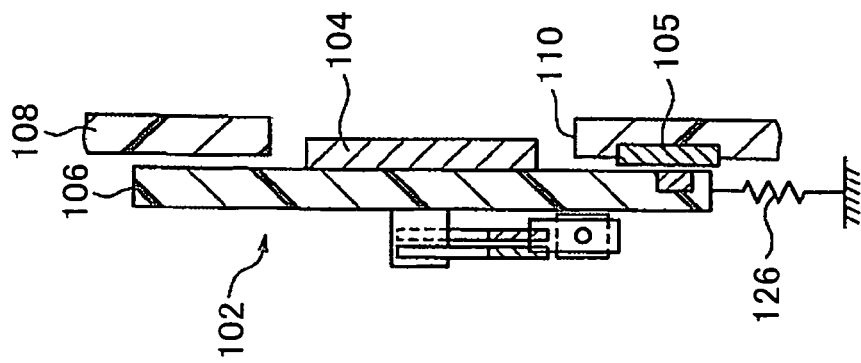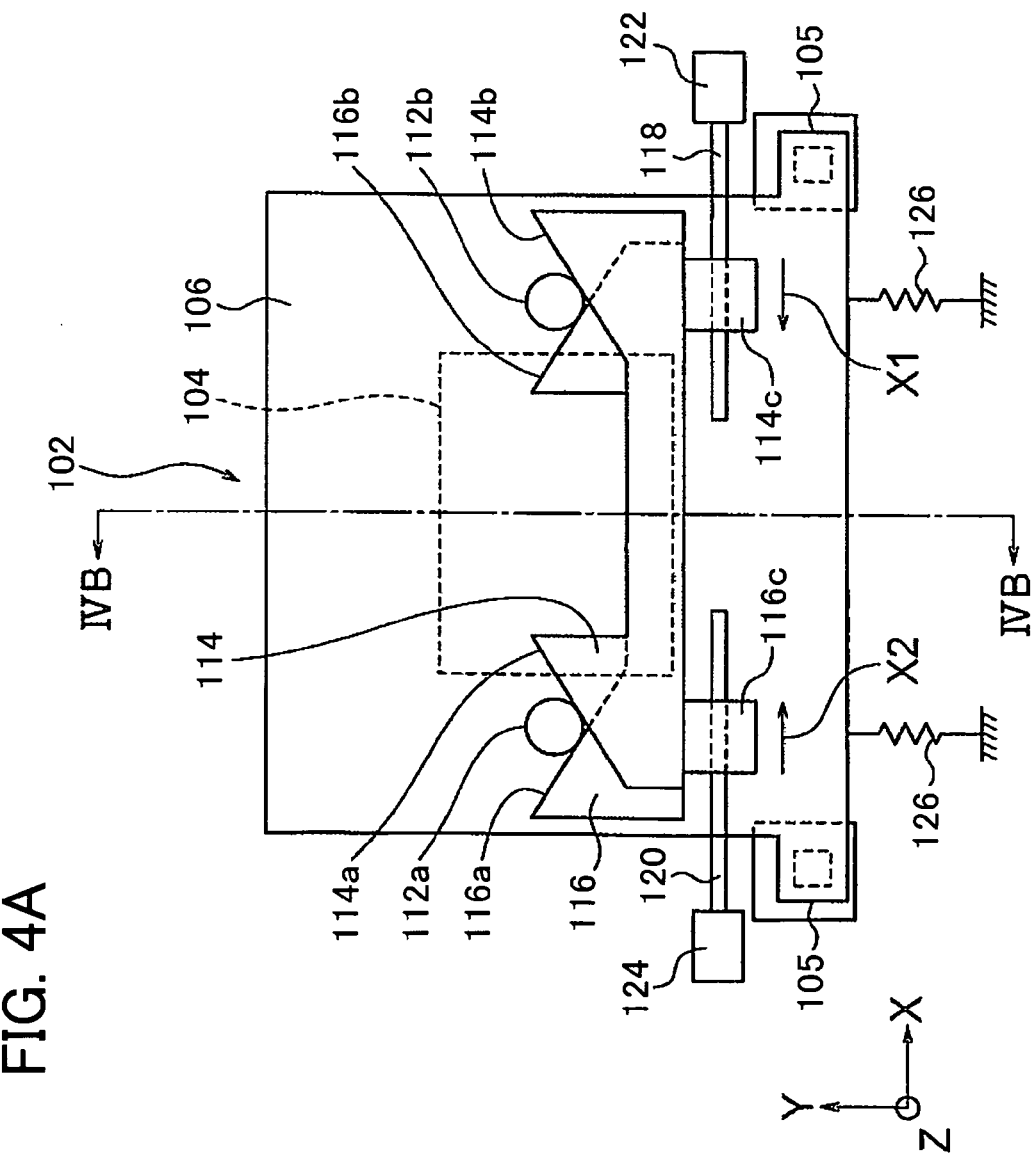

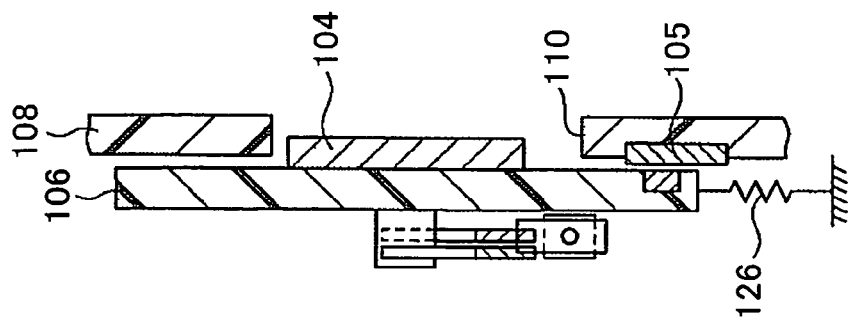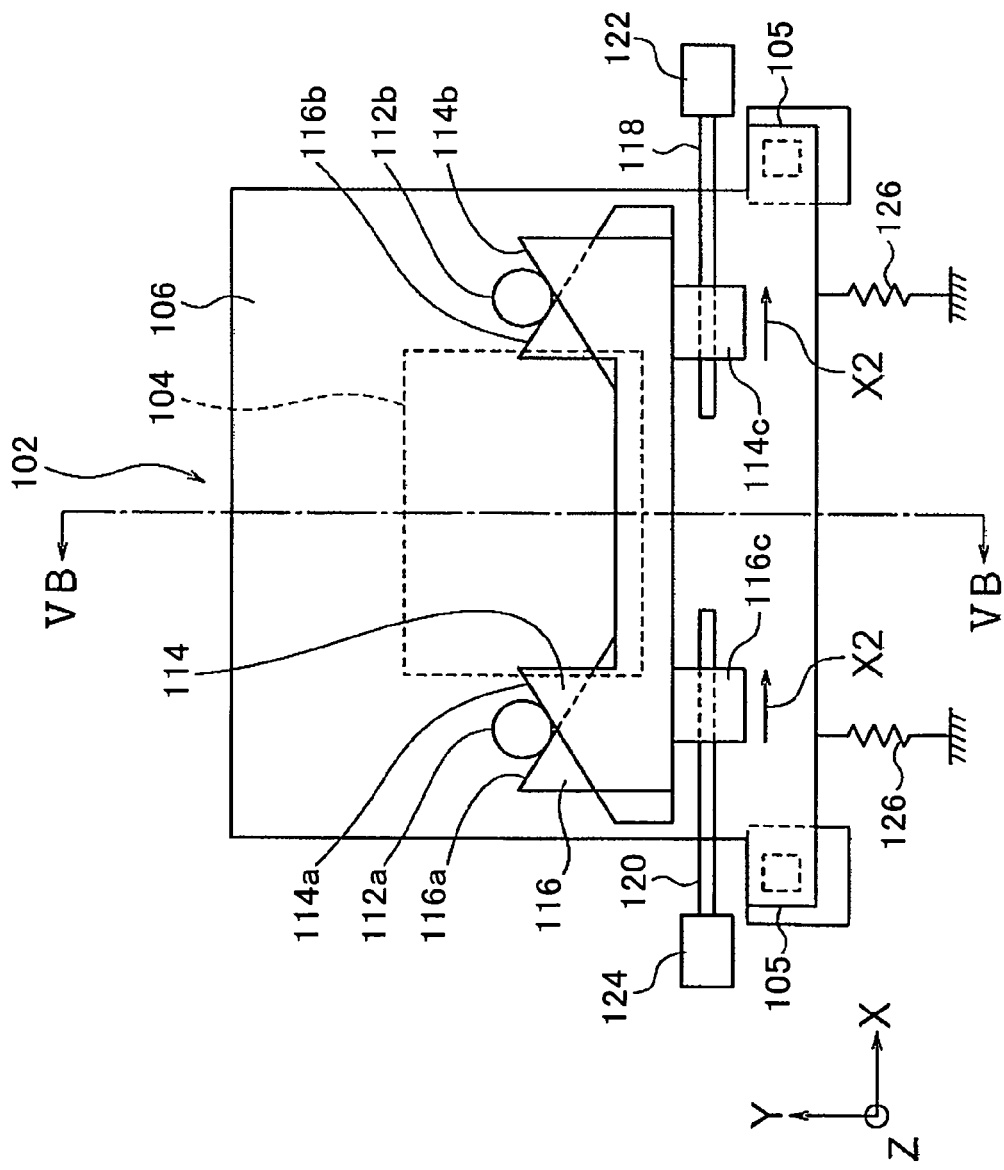

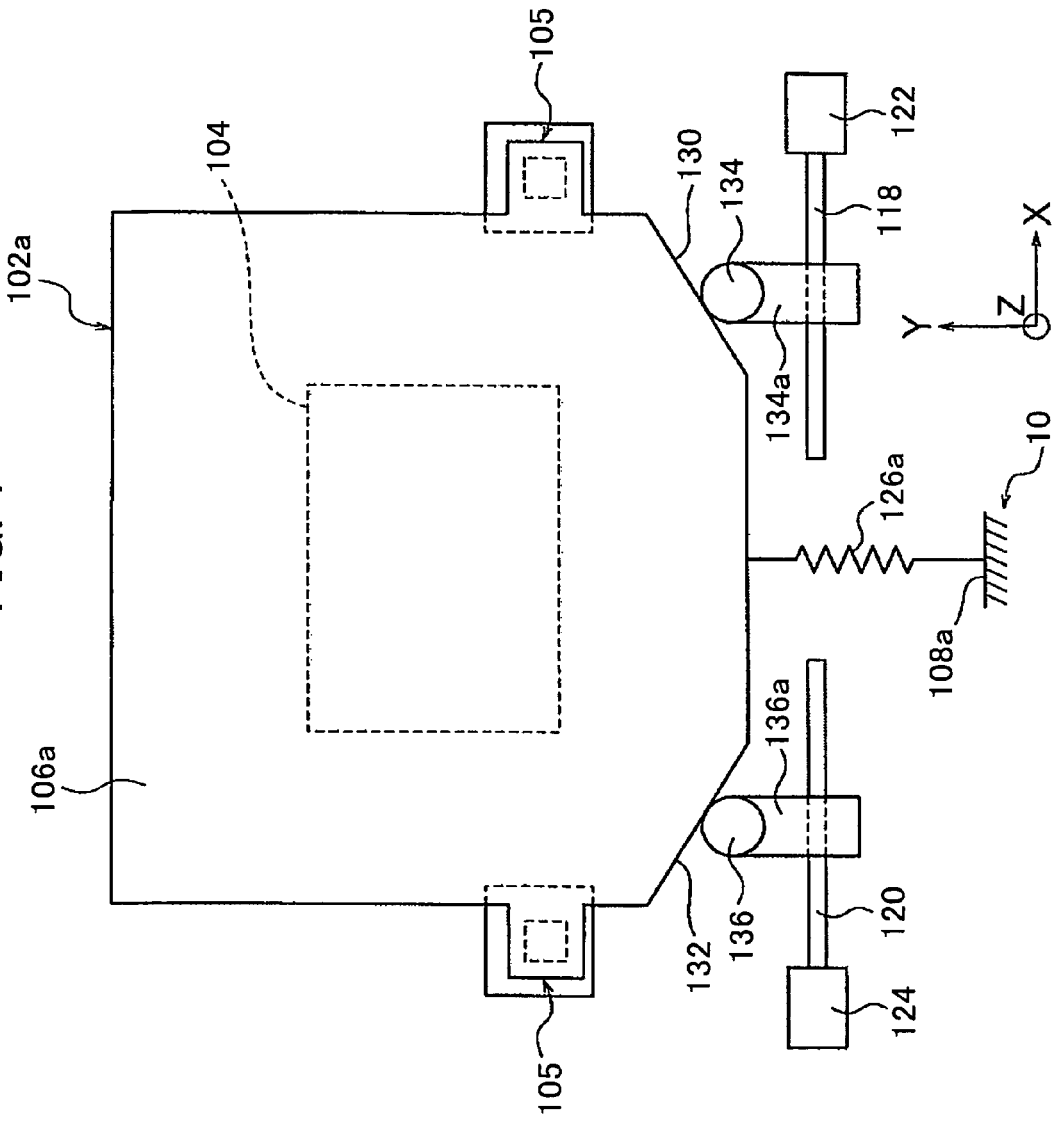

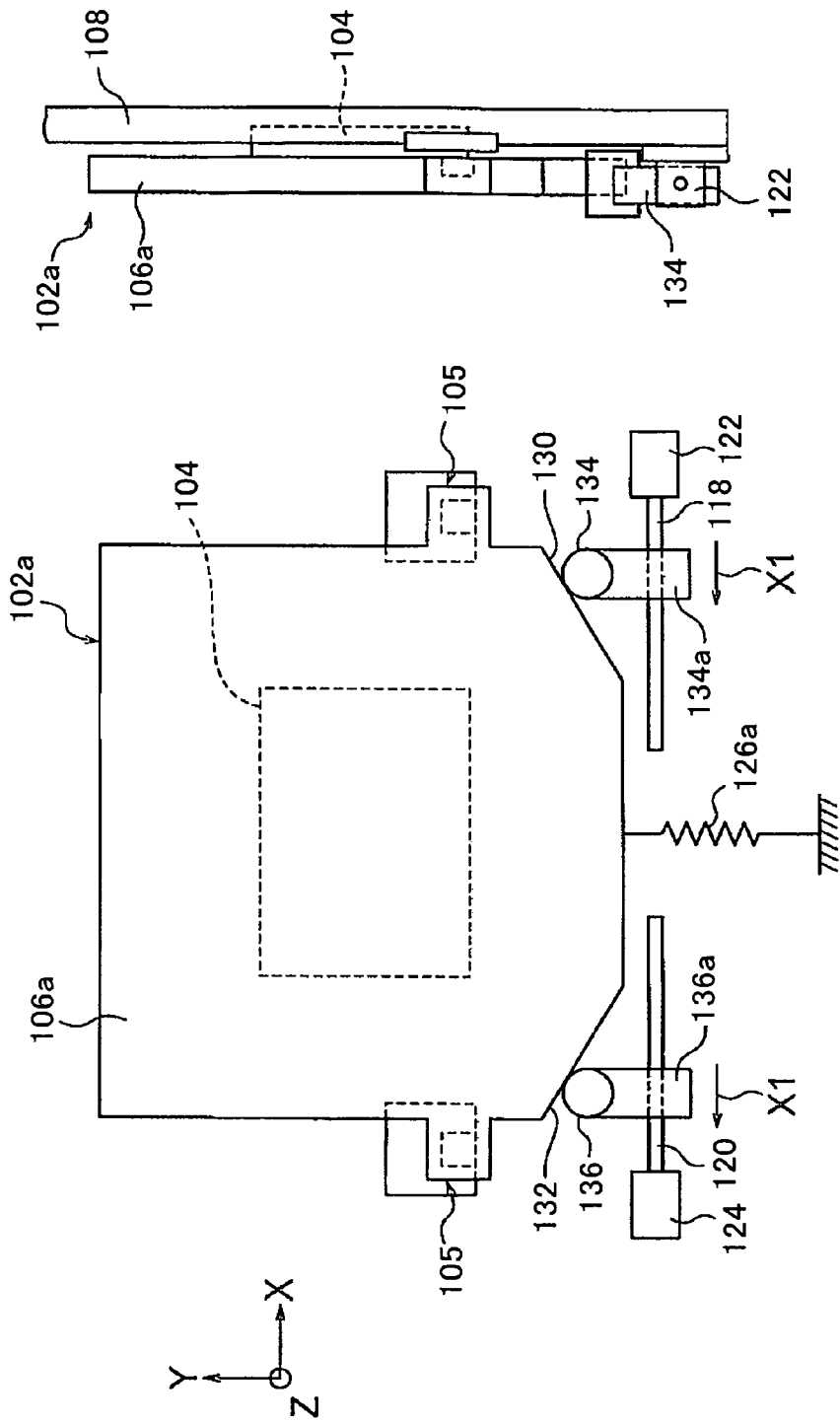

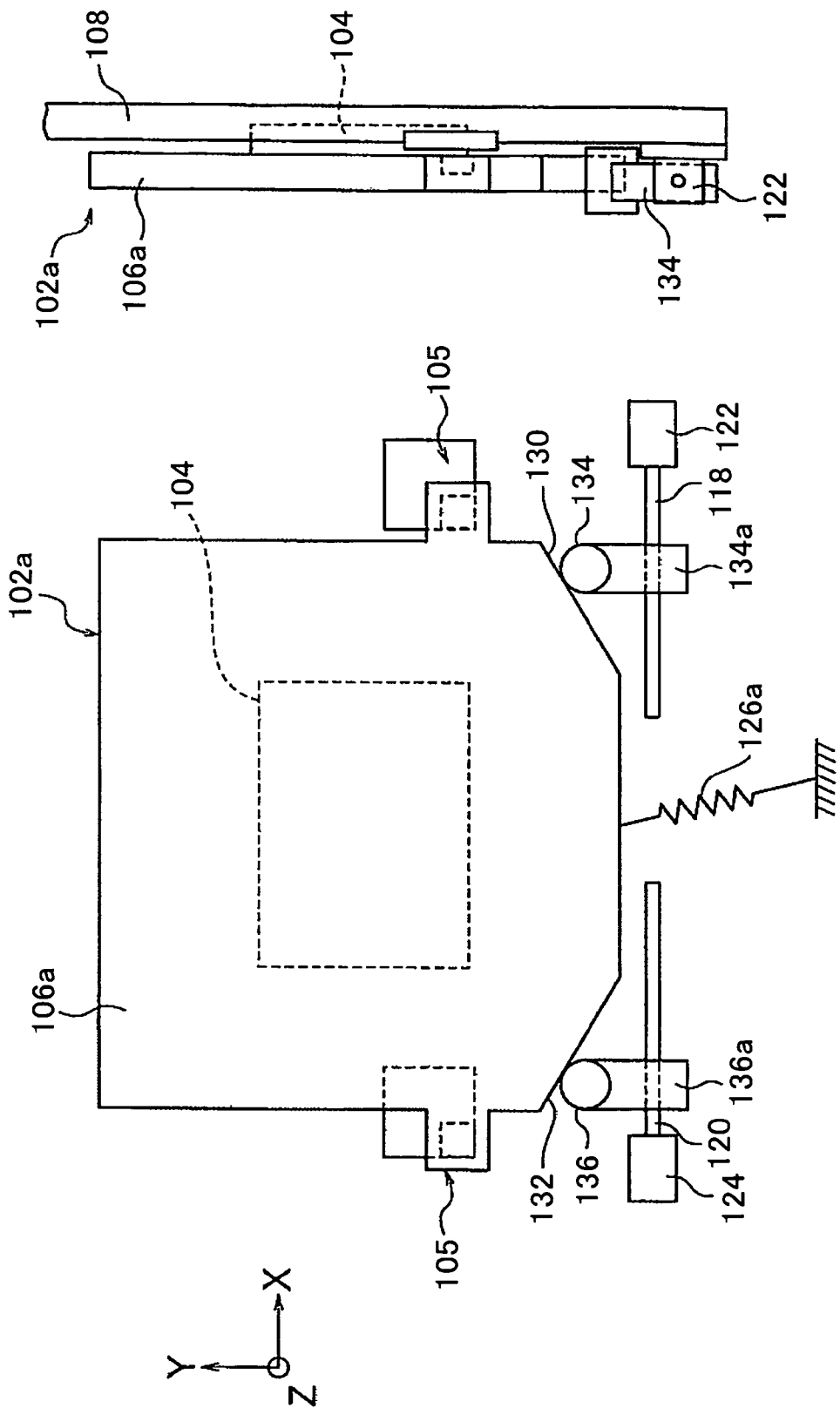

DRIVING MECHANISM AND OPTICAL EQUIPMENT

INCORPORATION BY REFERENCE

The present application claims priority under 35 U.S.C. §119 to Japanese Patent Applications No. 2008-071862 filed on Mar. 19, 2008, No. 2008-212864 filed on Aug. 21, 2008, No. 2008-212894 filed on Aug. 21, 2008, No. 2008-212977 filed on Aug. 21, 2008. The content of the application is incorporated herein by reference in its entirety.

BACKGROUND OF THE INVENTION

1. Field of the Invention

The present invention relates to a driving mechanism that drives an imaging element and to optical equipment provided with the driving mechanism.

2. Description of the Related art

There are many devices that serve as vibration reduction apparatuses which are capable of suppressing blur of captured images due to blurring caused by hand and the like. For example, a vibration reduction apparatus is known that moves an optical component, such as a correction lens, an imaging element or the like, in an X direction and a Y direction of an X-Y plane that is orthogonal to an optical axis Z, in accordance with detected vibrations. As a driving apparatus of this vibration reduction apparatus, a driving mechanism with a two-level structure is known. The driving mechanism is provided with an X-direction movement section and a Y-direction movement section that employ combinations of magnets and coils (for example, see Japanese Patent Application Laid-Open (JP-A) No. 2005-241751).

SUMMARY OF THE INVENTION

However, when these magnets and coils are used as the driving mechanism of a vibration reduction apparatus, weight of a camera is increased. Moreover, when a two-level structure is formed, the number of components increases and the apparatus is larger.

An object of the present invention is to provide a driving mechanism with which a reduction in size is possible and optical equipment provided with the driving mechanism.

The present invention achieves this object with the following solution.

In order to achieve the object mentioned above, according to a first aspect of the present invention, a driving mechanism is provided. The driving mechanism comprises: an optical component that is provided to be movable; a first driving member that is movable in a first direction; a second driving member that is movable in the first direction independently of the first driving member; and an abutting portion that is provided at the optical component and abuts against the first driving member and the second driving member, wherein, he optical component is moved by driving force of the first driving member and the second driving member abutting against the abutting portion.

The first direction may be parallel to a direction in which the optical component moves.

The abutting portion may include a pin protruding in a direction orthogonal to a direction in which the optical component moves, and at least two of the abutting portion are provided along the first direction.

The first driving member may include a first inclined face that engages with the abutting portion, and the second driving member includes a second inclined face that is inclined at a different angle from the first inclined face and engages with the abutting portion.

The driving mechanism may further comprise an urging member that urges the optical component in a second direction which is orthogonal to the first direction, wherein, the first inclined face and the second inclined face are inclined at substantially the same angle in opposite directions with respect to the second direction.

The abutting portion may include at least two of a first pin and a second pin provided along the first direction, the first driving member includes a first inclined face that engages with the first pin and a third inclined face that engages with the second pin, and the second driving member includes a second inclined face that engages with the first pin and a fourth inclined face that engages with the second pin.

An inclination angle of the third inclined face may be the same as an inclination angle of the first inclined face, and an inclination angle of the fourth inclined face is the same as an inclination angle of the second inclined face.

The abutting portion may include a slope inclined relative to the first direction, and at least two of the abutting portion are provided along the first direction.

The abutting portion may include a first inclined face that abuts against the first driving member, and a second inclined face that is inclined at a different angle from the first inclined face and abuts against the second driving member.

The driving mechanism may further comprising an urging member that urges the optical component in a second direction which is orthogonal to the first direction, and the first inclined face and the second inclined face may be inclined at substantially the same angle in opposite directions with respect to the second direction.

The first driving member may include a first pin that abuts against the first inclined face, and the second driving member includes a second pin that abuts against the second inclined face.

The optical component may include an imaging unit that captures an image with an optical system, and a stage that supports the imaging unit.

The optical component may include a vibration reduction optical system for correcting blur, and a stage that supports the vibration reduction optical system.

The driving mechanism may further comprise: a calculation section that calculates a relative movement position of the optical component with respect to a fixed position, from a position of the first driving member and a position of the second driving member.

According to a second aspect of the present invention, a driving mechanism of an imaging element is provided. The driving mechanism comprises: a fixed member; a moving member at which the imaging element is mounted and that is movable relative to the fixed member; a first driving member that is movable in a first direction relative to the fixed member; a second driving member that is movable in the first direction relative to the fixed member, independently of the first driving member; a third driving member that is movable in the first direction relative to the fixed member, independently of the first driving member and the second driving member; a fourth driving member that is movable in the first direction relative to the fixed member, independently of the first driving member, the second driving member and the third driving member; a first abutting portion that is provided at the moving member and abuts against the first driving member and the second driving member; and a second abutting portion that is provided at the moving member and abuts against the third driving member and the fourth driving member, wherein the moving member is moved by driving force of the first driving member and the second driving member abutting against the first abutting portion and by driving force of the third driving member and the fourth driving member abutting against the second abutting portion.

The first abutting portion and the second abutting portion may include pins protruding in a direction orthogonal to a direction in which the moving member moves.

The first driving member may include a first inclined face that engages with the first abutting portion, the second driving member includes a second inclined face that is inclined at a different angle from the first inclined face and engages with the first abutting portion, the third driving member includes a third inclined face that engages with the second abutting portion, and the fourth driving member includes a fourth inclined face that is inclined at a different angle from the third inclined face and engages with the second abutting portion.

The driving mechanism of the second aspect may further comprising an urging member that urges the moving member in a second direction which is orthogonal to the first direction, wherein the first inclined face and the second inclined face are inclined at substantially the same angle in opposite directions with respect to the second direction, and the third inclined face and the fourth inclined face are inclined at substantially the same angle in opposite directions with respect to the second direction.

An inclination angle of the second inclined face may be the same as an inclination angle of the first inclined face, and an inclination angle of the fourth inclined face is the same as an inclination angle of the second inclined face.

The driving mechanism according to the second aspect may further comprises a guide member that guides movement in the first direction of the first driving member, the second driving member, the third driving member and the fourth driving member relative to the fixed member.

The driving mechanism according to of the second aspect may further comprise a calculation section that calculates a relative movement position of the moving member with respect to a fixed position, from a position of the first driving member, a position of the second driving member, a position of the third driving member and a position of the fourth driving member.

According a third aspect of the present invention, a driving mechanism is provided. A driving mechanism of an imaging element, comprising: a fixed member; a moving member at which the imaging element is mounted and that is movable relative to the fixed member; a first driving member that is movable in a first direction relative to the fixed member; a second driving member that is movable in the first direction relative to the fixed member, independently of the first driving member; a third driving member that is movable in the first direction relative to the fixed member, independently of the first driving member and the second driving member; and a first abutting portion, a second abutting portion and a third abutting portion that are provided at the moving member, the first abutting portion abutting against the first driving member, the second abutting portion abutting against the second driving member, and the third abutting portion abutting against the third driving member, wherein the moving member is moved by driving force of the first driving member abutting against the first abutting portion, driving force of the second driving member abutting against the second abutting portion, and driving force of the third driving member abutting against the third abutting portion.

The first abutting portion may include a first inclined face that is inclined relative to the first direction, the second abutting portion includes a second inclined face that is inclined relative to the first direction, and the third abutting portion includes a slit provided in a second direction which is orthogonal to the first direction.

The first inclined face of the first abutting portion and the second inclined face of the second abutting portion may be inclined at different angles.

The driving mechanism according to the third aspect may further comprise an urging member that urges the moving member in the second direction relative to the first direction, wherein the first inclined face and the second inclined face are inclined at substantially the same angle in opposite directions with respect to the second direction.

The first driving member may include a first pin that abuts against the first inclined face, the second driving member includes a second pin that abuts against the second inclined face, and the third driving member includes a third pin that is inserted into the slit.

The driving mechanism according to the third aspect may further comprise a calculation section that calculates a relative movement position of the moving member with respect to a fixed position, from a position of the first driving member and a position of the second driving member.

According to a fourth aspect of the present invention, a driving mechanism of an imaging element is provided. The driving mechanism may comprise: a driving mechanism of an imaging element, comprising: a fixed member; and a moving member at which the imaging element is mounted and that is movable relative to the fixed member; wherein three engaging portions are provided at the moving member, and three driving members are provided at the fixed member, the driving members being driveable independently of one another and transmitting driving force to the respective engaging portions via driving force transmission members.

The moving member may be turned relative to the fixed member by the driving members being driven independently of one another and transmitting driving force to the respective engaging portions via the driving force transmission members.

At least one of the driving members may include a shaft portion that is driven to turn relative to the fixed member, and the driving force transmission member turns together with the shaft portion, and retains the engaging portion to be turnable relative to the shaft portion and movable in a radial direction with respect to the shaft portion.

At least one of the driving members may include a stepping motor.

At least one of the driving members may be capable of moving the driving force transmission member in a straight line, and the driving force transmission member retains the engaging portion to be movable in a direction orthogonal to the straight line.

At least one of the driving members may include a piezoelectric actuator.

The engaging portions may include a protrusion provided at the moving member.

The driving mechanism according to the fourth aspect may further comprise an urging member that urges the moving member in a direction parallel to the fixed member and prevents looseness between the engaging portions and the driving force transmission members.

According to a fifth aspect of the present invention, optical equipment comprising the above driving mechanism is provided.

According to the present invention, a driving mechanism and optical equipment that are reduced in size can be provided.

BRIEF DESCRIPTION OF THE DRAWINGS

FIG. 4A is a rear view illustrating a movement of the vibration reduction apparatus of the first embodiment, and FIG. 4B is a sectional view of FIG. 4A;

FIG. 5A is a rear view illustrating a movement of the vibration reduction apparatus of the first embodiment, and FIG. 5B is a sectional view of FIG. 5A;

FIG. 7 is a rear view of a vibration reduction apparatus of a second embodiment of the present invention;

FIG. 10A is a rear view illustrating a movement of the vibration reduction apparatus of the second embodiment, and FIG. 10B is a side view of FIG. 10A;

FIG. 11A is a rear view illustrating a movement of the vibration reduction apparatus of the second embodiment, and FIG. 11B is a side view of FIG. 11A;

DETAILED DESCRIPTION OF THE PREFERRED EMBODIMENT

First Embodiment

Figure 1:
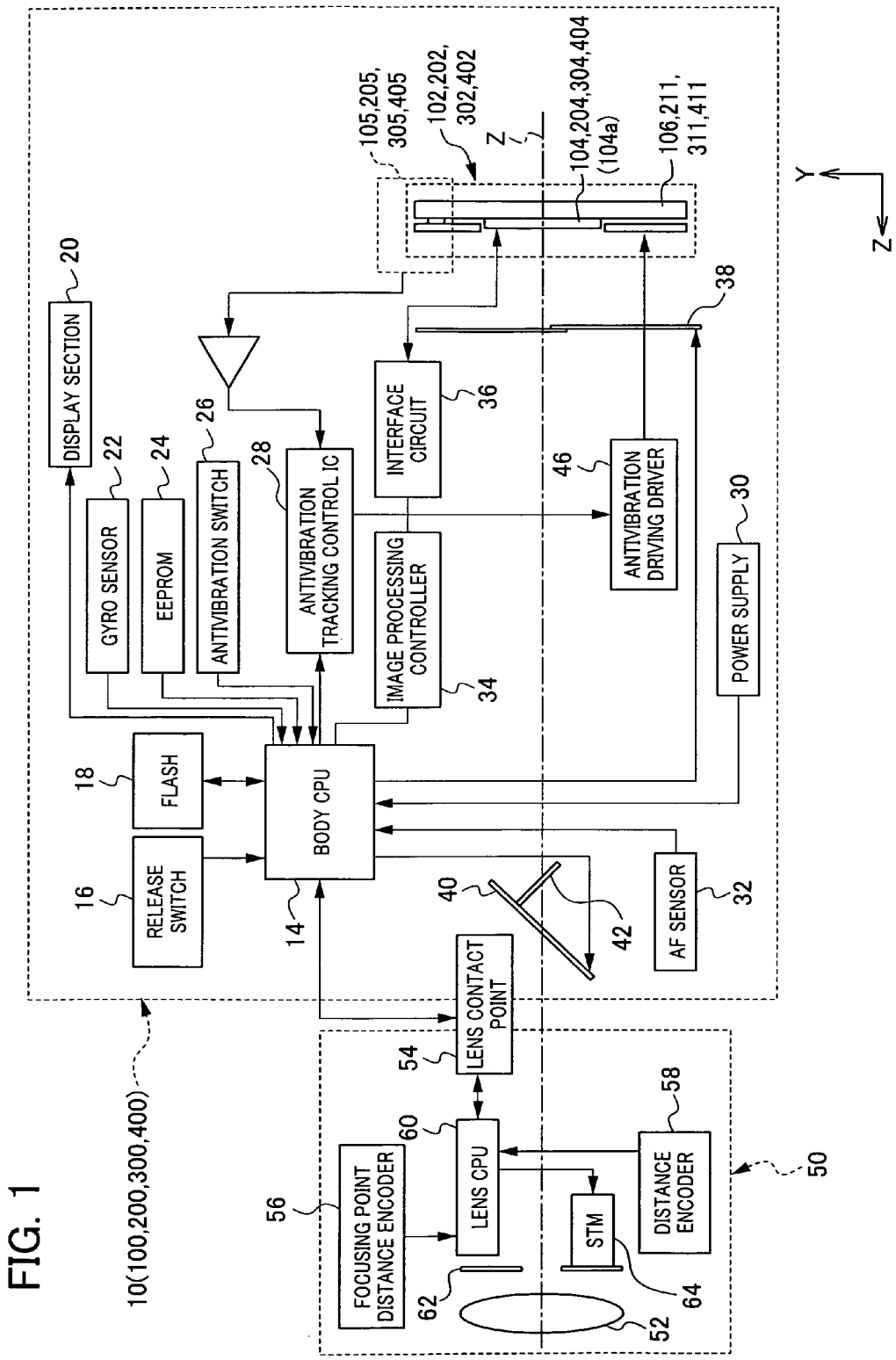
FIG. 1 is an overall block diagram of a camera of a first embodiment of the present invention.

Herebelow, a first embodiment of the present invention is described with reference to the attached drawings and such-like. In the drawings represented hereinafter, an XYZ orthogonal coordinate system is established for ease of explanation and understanding. In this coordinate system, for a position of a camera when a photographer is keeping an optical axis A horizontal and photographing a landscape-oriented image (hereinafter referred to as a usual position), a direction to leftward in the photographer's point of view is the +X direction. The direction to upward in the usual position is the +Y position, and the direction toward the object in the usual position is the +Z position.

FIG. 1 is a diagram illustrating overall structure of a camera 100 (a camera body 10) of the first embodiment and a detachable lens barrel 50 at the camera 100. In the first embodiment, a mode is described in which the lens barrel 50 is removable from the camera 100, but this is not to be limiting. The present invention is also applicable to a "compact camera" in which the lens barrel 50 and the camera body 10 are integral. Furthermore, the present invention is not to be limited to a still camera but may be other optical equipment such as a video camera, a telescope, a mobile telephone or the like.

First, the camera body 10 will be described. The camera body 10 is equipped with a body CPU 14. The body CPU 14 is connected to a release switch 16, a flash 18, a display section 20, a gyro sensor 22, an EEPROM (memory) 24, an antivibration switch 26, an antivibration tracking control IC 28, a power supply 30, an AF sensor 32 and an image processing controller 34.

The release switch 16 is a switch that controls a timing of shutter driving. The release switch 16 outputs the state of the switch to the body CPU 14. When the release switch 16 is half-pressed, AF, AE and, depending on conditions, antivibration driving are carried out. When the release switch 16 is fully pressed, mirror-raising, shutter-driving and the like are carried out.

The display section 20 is principally constituted by a liquid crystal display device or the like. The display section 20 displays output results, menus and so forth. The gyro sensor 22 senses angular speeds of blur that occur in the body, and outputs the same to the body CPU 14.

The EEPROM 24 holds information such as a gain value, angle adjustment values and the like of the gyro sensor, and outputs the same to the body CPU 14.

The antivibration switch 26 outputs an on/off state of vibration protection to the body CPU 14. The AF sensor 32 is a sensor for performing autofocusing (AF). An ordinary CCD is employed as the AF sensor 32.

The image processing controller 34 controls image processing of an image captured at an imaging element, and is connected, via an interface circuit 36, to an imaging element 104a of an imaging unit 104. The imaging element 104a is a solid-state imaging element such as, for example, a CCD, a CMOS or the like.

The imaging unit 104 is attached to a driving mechanism 102, which will be described later. The imaging unit 104 is disposed inside the camera body 10 such that a light-receiving face of the imaging unit 104 substantially orthogonally intersects an optical axis Z of an optical lens unit 52 of the lens barrel 50.

A shutter member 38 is disposed on the Z axis in front of the imaging unit 104. The shutter member 38 is a mechanism that controls an exposure duration. Information on the release switch 16 is inputted to the shutter member 38 from the body CPU 14, and shutter driving is performed when the release switch 16 is fully pressed. The shutter member 38 is driven by an unillustrated shutter driving component (for example, a DC motor).

A mirror 40 is disposed on the Z axis in front of the shutter member 38. The mirror 40 reflects an image into a viewfinder during image composition, and is withdrawn from the optical path during exposure. Information on the release switch 16 is inputted to the mirror 40 from the body CPU 14. The mirror is raised when the release switch 16 is fully pressed, and the mirror is lowered after exposure has finished. The mirror 40 is driven by an unillustrated mirror driving component (for example, a DC motor).

A sub-mirror 42 is linked with the mirror 40. The sub-mirror 42 is a mirror for supplying light to the AF sensor 32. The sub-mirror 42 reflects light flux that has passed through the mirror 40 and guides the same to the AF sensor 32. The sub-mirror 42 is withdrawn from the optical path during exposure.

The antivibration tracking control IC 28 is an IC for performing antivibration control. The antivibration tracking control IC 28 calculates an imaging unit movement amount from an imaging unit target position that is inputted from the body CPU 14 and imaging unit position information that is inputted from position sensors 105, which will be described later, and outputs the imaging unit movement amount to an antivibration driving driver 46. That is, signals of the position of the imaging unit 104 are inputted to the antivibration tracking control IC 28 from the position sensors 105, and an output signal from the body CPU 14 is inputted to the antivibration tracking control IC 28. The body CPU 14 calculates the imaging unit target position from: an angle of blur that is calculated by receiving output from the gyro sensor 22; focusing distance information detected by a focusing point distance encoder 56, which will be described later; distance information detected by a distance encoder 58; and the like. The body CPU 14 outputs the imaging unit target position to the antivibration tracking control IC 28.

Figure 2:
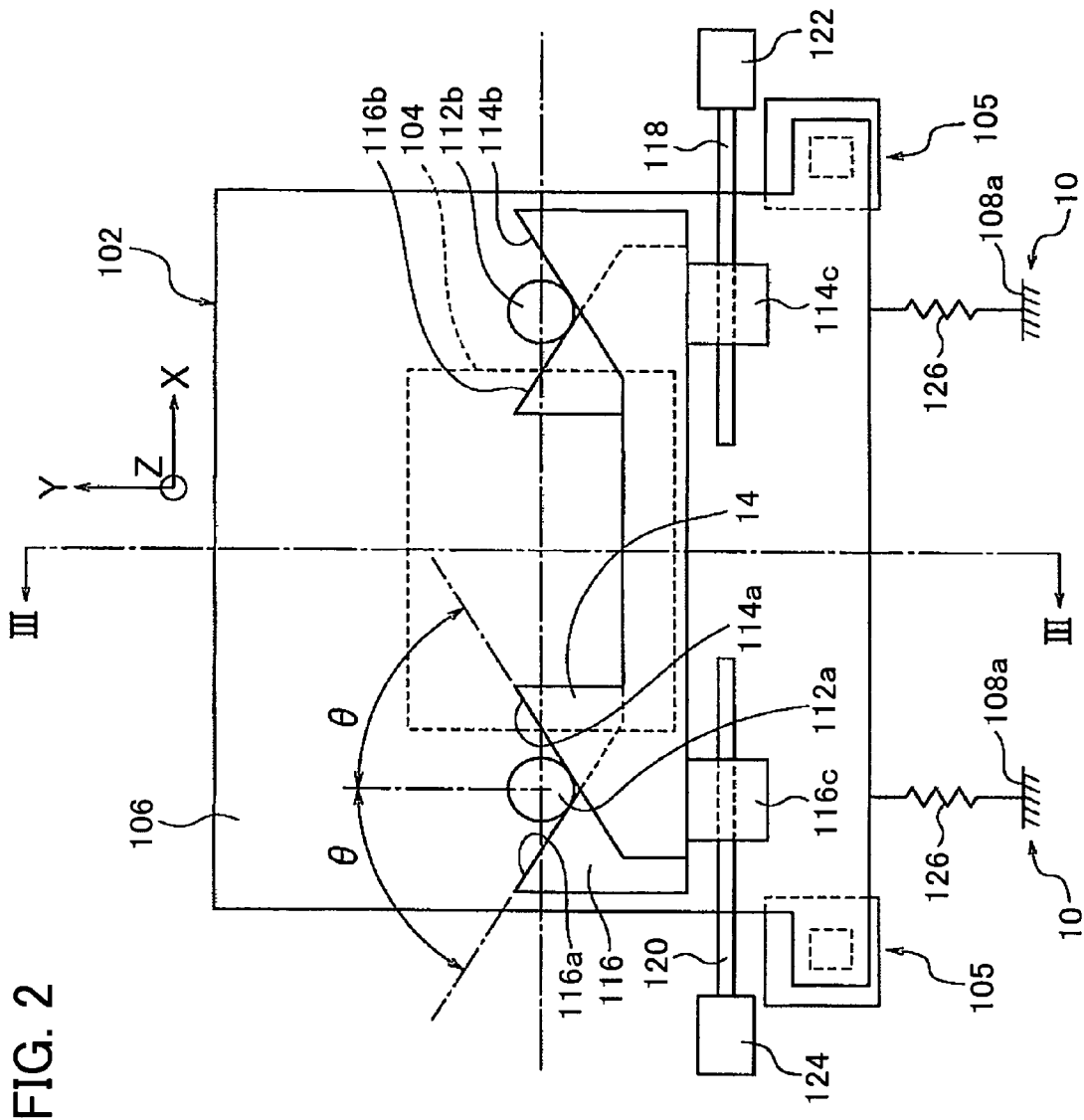
FIG. 2 is a rear view of a vibration reduction apparatus illustrated in FIG. 1.

The antivibration driving driver 46 is a driver for controlling the driving mechanism 102 of the imaging unit 104. The antivibration driving driver 46 receives input of driving amounts from the antivibration tracking control IC 28 and controls driving directions and driving amounts of the imaging unit 104, namely, of a movable plate 106. That is, the antivibration driving driver 46 controls actuators 118, 119 and 120 of the driving mechanism 102, which is illustrated in FIG. 2, on the basis of input information from the antivibration tracking control IC 28. The antivibration driving driver 46 implements image vibration reduction control by moving the imaging unit 104 together with the movable plate 106 in the X-axis and Y-axis directions relative to a fixed plate 117, and turning the imaging unit 104 together with the movable plate 106 about the Z axis.

The body CPU 14 calculates the imaging unit target position from information that is inputted from the EEPROM 24, an angle of blur that is calculated by receiving output from the gyro sensor 22, and the focusing point distance information and the distance information, and outputs the imaging unit target information to the antivibration tracking control IC 28. Sensor output of the gyro sensor 22 is also inputted to the body CPU 14 via an unillustrated amplifier, and the body CPU 14 finds a vibration angle by integrating angular speeds of the gyro sensor 22.

The body CPU 14 implements communications regarding whether or not the lens barrel 50 is properly mounted, and calculates the target position from the focusing point distance and distance information, which are inputted through a lens CPU 60, and the gyro sensor. While the release switch 16 is half-pressed, depending on conditions of AE, AF and the like, the body CPU 14 outputs instructions for shooting preparation operations, such as antivibration driving and the like, to the lens CPU 60 and the antivibration tracking control IC 28. When the release switch 16 is fully pressed, the body CPU 14 outputs instructions for mirror driving, shutter driving, aperture driving and the like.

Next, the lens barrel 50 is described. The lens barrel 50 is provided with a lens contact point 54, the focusing point distance encoder 56, the distance encoder 58, the lens CPU 60, an aperture section 62, a driving motor 64 that controls the aperture section 62, and a plural number of optical lens unit 52.

The lens contact point 54 is provided with contact points for supplying a lens driving system power supply from the camera body 10, contact points of a CPU power supply for driving the lens CPU 60, and contact points for digital communications. The driving system power supply and the CPU power supply are supplied with power from the power supply 30 of the camera body 10. The digital communication contact points implement communications for inputting digital information of focusing point distances, object distances, focusing position information and the like from the lens CPU 60 to the body CPU 14, and communications for inputting digital information of focusing positions, aperture amounts and the like from the body CPU 14 to the lens CPU 60. The lens CPU 60 receives focusing position information and aperture amount information from the body CPU 14, and performs AF and aperture control.

The focusing point distance encoder 56 converts position information of a zoom lens unit to a focusing point distance. That is, the focusing point distance encoder 56 encodes the focusing point distance, and outputs the same to the lens CPU 60. The distance encoder 58 converts position information of a focusing lens unit to an object distance. That is, the distance encoder 58 encodes the object distance, and outputs the same to the lens CPU.

The lens CPU 60 includes functions for communication with the camera body 10 and functions for control of the optical lens unit 52. The focusing point distance, object distance and the like are inputted to the lens CPU 60 and then outputted to the body CPU 14 via the lens contact point. Release information and AF information are inputted from the body CPU 14 to the lens CPU 60 via the lens contact point 54.

Figure 3:
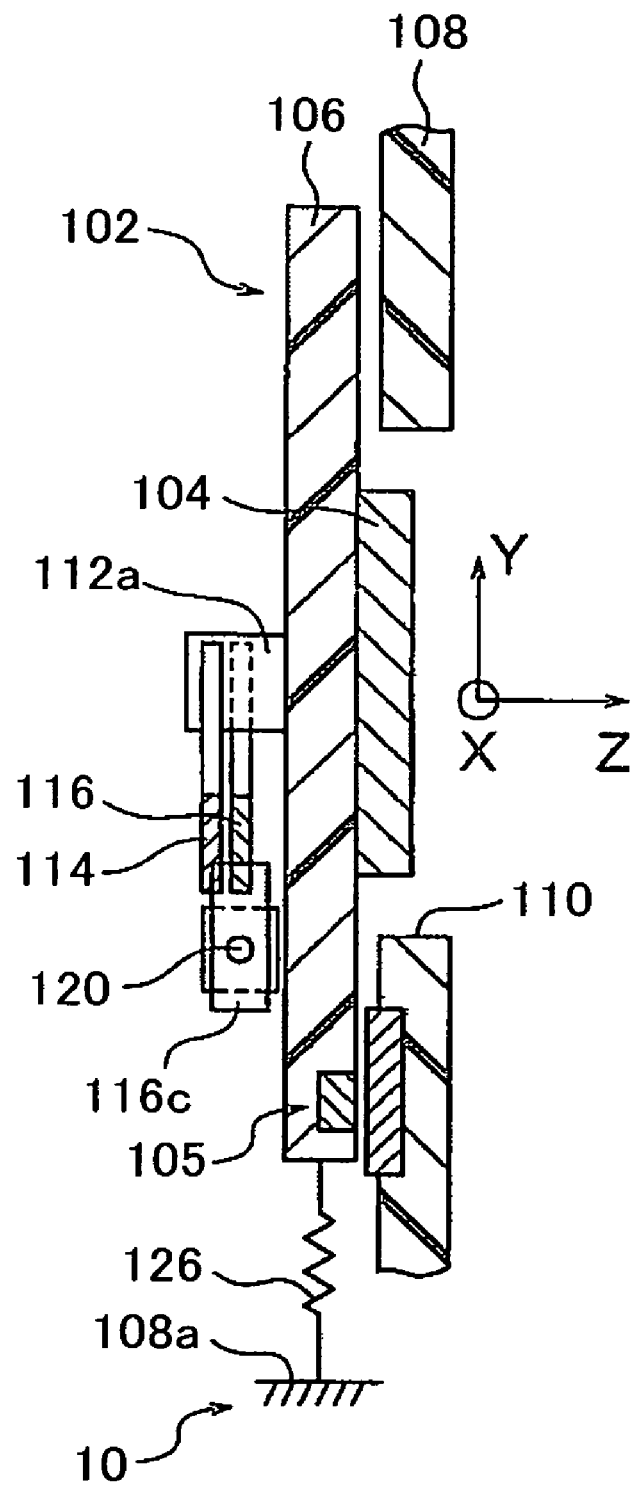
FIG. 3 is a sectional view cut along the line III-III shown in FIG. 2.
Figure 6A:
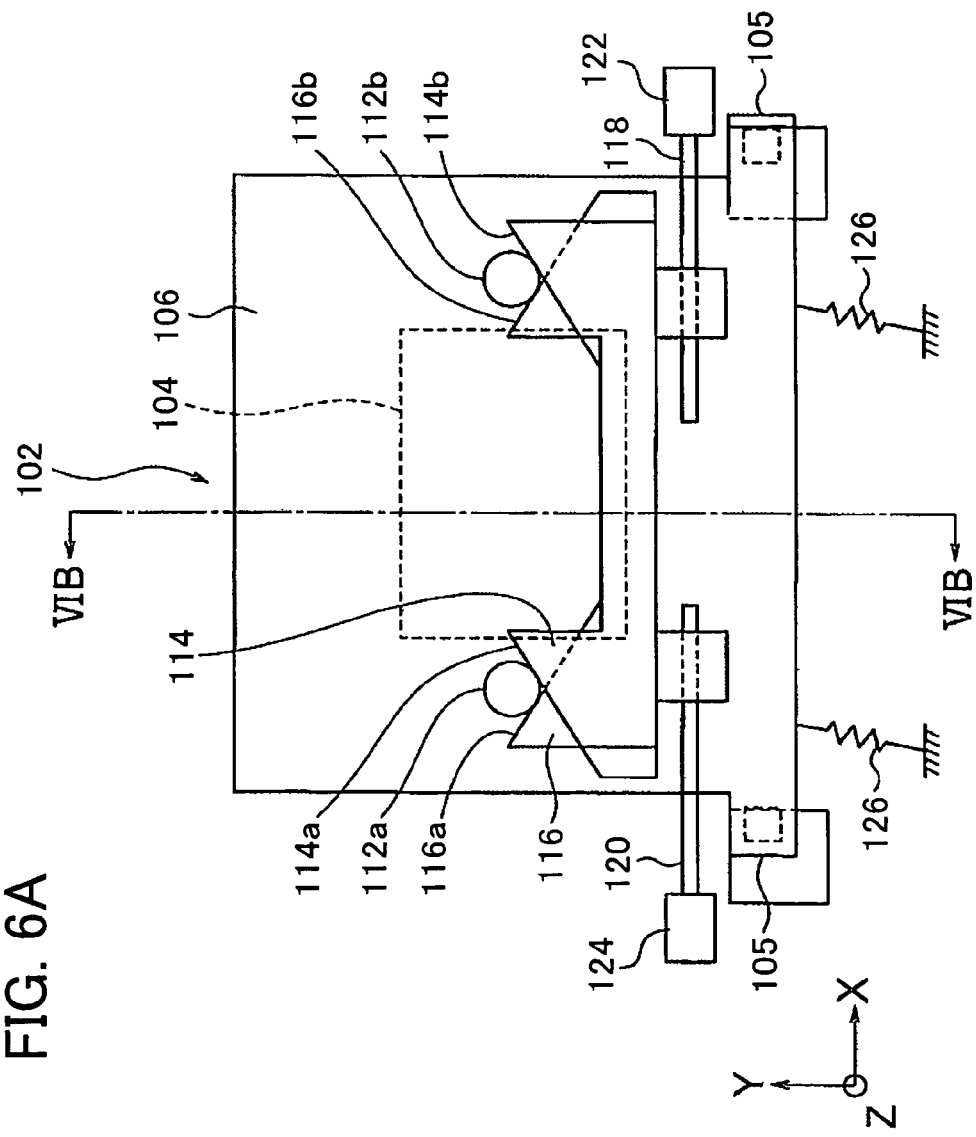
FIG. 6A is a rear view illustrating a movement of the vibration reduction apparatus of the first embodiment.
Figure 6B:
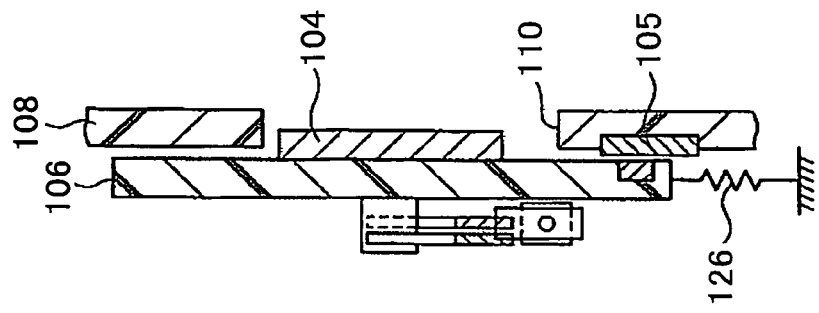
FIG. 6B is a sectional view of FIG. 6A.

As shown in FIG. 2 and FIG. 3, the driving mechanism 102 relating to the first embodiment includes a movable plate 106, at a substantially central portion of a plate surface of which the imaging unit 104 is disposed. Fixed portions 108 and 108a illustrated in FIG. 3 are fixed relative to the camera body 10 illustrated in FIG. 1. The movable plate 106 is retained to be movable in the X-axis and Y-axis directions, which are in the plane orthogonal to the optical axis Z, relative to the fixed portions 108 and 108a.

An opening portion 110 with an opening area greater than a profile of the imaging unit 104 is formed in the fixed portion 108. The opening portion 110 is formed such that object light, which is incident through the optical lens unit 52 illustrated in FIG. 1, is not impeded from being incident on the imaging face of the imaging unit 104. The opening area of the opening portion 110 formed in the fixed portion 108 is significantly larger than the profile of the imaging unit 104 in order to allow movement of the imaging unit 104 in the X-axis and Y-axis directions in accordance with vibration reduction operations.

In this embodiment, a pair of the position sensors 105 are mounted between the fixed portion 108 and the movable plate 106. Thus, it is possible to detect relative positions of the movable plate 106 in the X-axis and Y-axis directions with respect to the fixed portion 108. A combination of, for example, a magnet and a Hall device or the like is employed as each position sensor 105.

A pair of a first cam pin 112a and a second cam pin 112b are fixed to a surface (hereinafter referred to as the rear face) of the movable plate 106 that is the opposite side of the surface (hereinafter referred to as the front face) at which the imaging unit 104 is mounted. At a central position in the Y-axis direction, the first cam pin 112a and second cam pin 112b protrude in the Z-axis direction from positions with a predetermined spacing in the X-axis direction.

The pair of cam pins 112a and 112b are disposed at positions which are symmetrical about a center line along the Y-axis direction. Furthermore, the pair of cam pins 112a and 112b are disposed to be separated by the predetermined spacing on the rear face of the movable plate 106 so as to be disposed outside the profile of the imaging unit 104.

A pair of a first driving member 114 and a second driving member 116, which are narrow and long in the X-axis direction, are disposed at the rear face of the movable plate 106 to be movable relative to one another along the X-axis direction. The driving members 114 and 116 are formed in plate shapes, and are disposed to be parallel with one another.

A first cam face 114a is formed at the first driving member 114. The first cam face 114a engages with the first cam pin 112a. A second cam face 116a is formed at the second driving member 116. The second cam face 116a engages with the first cam pin 112a.

The cam faces 114a and 116a are inclined at the same angle θ, in opposite directions to one another, with respect to the Y-axis. The center of the first cam pin 112a is disposed upward in the Y-axis direction relative to a point of intersection of the cam faces 114a and 116a.

Similarly, a third cam face 114b is formed at the first driving member 114 and engages with the second cam pin 112b, and a fourth cam face 116b is formed at the second driving member 116 and engages with the second cam pin 112b.

The cam faces 114b and 116b are at angles parallel to the cam faces 114a and 116a, respectively. The center of the second cam pin 112b is disposed above a point of intersection of the cam faces 114b and 116b in the Y-axis direction.

One ends of a pair of springs 126, which are disposed below the cam pins 112a and 112b in the Y-axis direction, are attached to the movable plate 106 such that the cam pins 112a and 112b constantly touch against the positions of intersection of the respective cam faces. The other ends of the springs 126 are fixed to the fixed portion 108a of the camera body 10. The movable plate 106 is urged downward in the Y-axis direction by these springs 126. As a result, the cam pin 112a is pressed against the intersection portion of the cam faces 114a and 116a, and the cam pin 112b is pressed against the intersection portion of the cam faces 114b and 116b. Urging force from the springs 126 acts in the Y-axis direction, preferably matching the direction of gravity in the usual holding position of the camera.

A driving threaded hole member 114c is fixed at a portion of the first driving member 114 that is at the opposite side thereof in the Y-axis direction from the third cam face 114b. A driving threaded rod 118, which extends in the X-axis direction, is threadingly engaged with the driving threaded hole member 114c. The driving threaded rod 118 is driven to turn about its own axis by a stepping motor 122. The stepping motor 122 is fixed with respect to the fixed portion 108a of the camera body 10.

Similarly, a driving threaded hole member 116c is fixed at a portion of the second driving member 116 that is at the opposite side thereof in the Y-axis direction from the second cam face 116a. A driving threaded rod 120, which extends in the X-axis direction, is threadingly engaged with the driving threaded hole member 116c. The driving threaded rod 120 is driven to turn about its own axis by a stepping motor 124. The stepping motor 124 is fixed with respect to the fixed portion 108a of the camera body 10.

The axes of the driving threaded rods 118 and 120 preferably coincide along the X-axis direction. It is preferable if the driving threaded rods 118 and 120 have the same external diameter and are formed with the same or mutually symmetrical driving thread portions. It is also preferable if the stepping motors 122 and 124 have mutually equivalent characteristics.

When driving signals are inputted to the stepping motors 122 and 124 from the antivibration driving driver 46 illustrated in FIG. 1, the driving threaded rods 118 and 120 turn in accordance with the driving signals. For example, as shown from FIG. 4A to FIG. 5A and from FIG. 4B to FIG. 5B, a driving signal is inputted to the stepping motor 122 so as to move the first driving member 114 in direction X1 relative to the driving threaded rod 118 extending along the X-axis, and a driving signal is inputted to the stepping motor 124 so as to move the second driving member 116 in direction X2, which is the opposite direction to direction X1, by the same amount of movement as the first driving member 114.

At this time, as shown in FIG. 5A and FIG. 5B, the cam pins 112a and 112b are shifted upward in the Y-axis direction together with the respectively engaging intersection portions of the cam faces 114a and 116a and the cam faces 114b and 116b. As a result, the movable plate 106 and the imaging unit 104 move upward in the Y-axis direction relative to the fixed portion 108, against the spring force of the springs 126. When a control operation opposite to that described above is applied to the stepping motors 122 and 124, the imaging unit 104 moves downward in the Y-axis direction relative to the fixed portion 108.

Now, in order to shift the imaging unit 104 in the X-axis direction, for example, an operation as shown from FIG. 5A to FIG. 6A and from FIG. 5B to FIG. 6B is carried out. That is, a driving signal may be inputted to the stepping motor 122 so as to move the first driving member 114 in direction X2 relative to the driving threaded rod 118 extending along the X axis, and a driving signal may be inputted to the stepping motor 124 so as to move the second driving member 116 in the same direction X2 by the same movement amount as the first driving member 114.

By combining the above-described control operations of the stepping motors 122 and 124, it is possible to shift the imaging unit 104 to arbitrary positions of the X axis and Y axis relative to the fixed portion 108. In this first embodiment, control of the stepping motors 122 and 124 is feedback control: relative X-Y positions of the imaging unit 104 with respect to the fixed portion 108 are detected on the basis of output signals of the pair of position sensors 105, and control is carried out on the basis of the detection signals.

In the driving mechanism 102 of the first embodiment, the driving members 114 and 116 may be arranged in the same direction along the X axis, and the position of the movable plate 106 is set by the positions of the cam pins 112a and 112b at the intersection portions of the linear cam faces 114a, 116a, 114b and 116b. Therefore, it is possible to move the imaging unit 104 with high positional accuracy. Moreover, because it is possible to dispose the driving threaded rods 118 and 120 for moving the driving members 114 and 116 substantially in the same straight line, there is no need for a stage to be formed in two levels, the overall device may be made thinner (smaller), and this contributes to a reduction in the number of components.

Furthermore, there is no need for a gear train, a linking mechanism or the like at the driving mechanism 102 of the first embodiment. Rather, with the constitution in which the cam pins 112a and 112b relatively move the imaging unit 104 by engaging with the cam faces of the driving members 114 and 116, the number of components may be reduced, and weight may be lightened and manufacturing costs lowered.

In the driving mechanism 102 of the first embodiment, when control of the vibration reduction apparatus stops or when the provision of electricity to the stepping motors 122 and 124 stops, the movable plate 106 maintains the state thereof at the time of stopping. Therefore, in contrast to a conventional example in which the imaging unit 104 moves the fixed movable plate 106 with electromagnetic force, a locking mechanism for fixing the relative position of the imaging unit 104 at a time of control stopping, a time of provision of electricity stopping or the like is not required in the driving mechanism 102 of the first embodiment.

In the driving mechanism 102 of the first embodiment, because the driving mechanism 102 is a mechanism that moves the movable plate 106 parallel with the fixed portion 108, there is no risk of the movable plate 106 relatively turning with respect to the fixed portion 108, and there is no need to separately provide a guide or the like to prevent relative turning. This also contributes to a reduction in the number of components.

Second Embodiment

Next, a second embodiment of the present invention is described. In the following descriptions, portions that are the same as in the first embodiment are assigned the same reference numerals, and descriptions thereof are not given.

Figure 8:
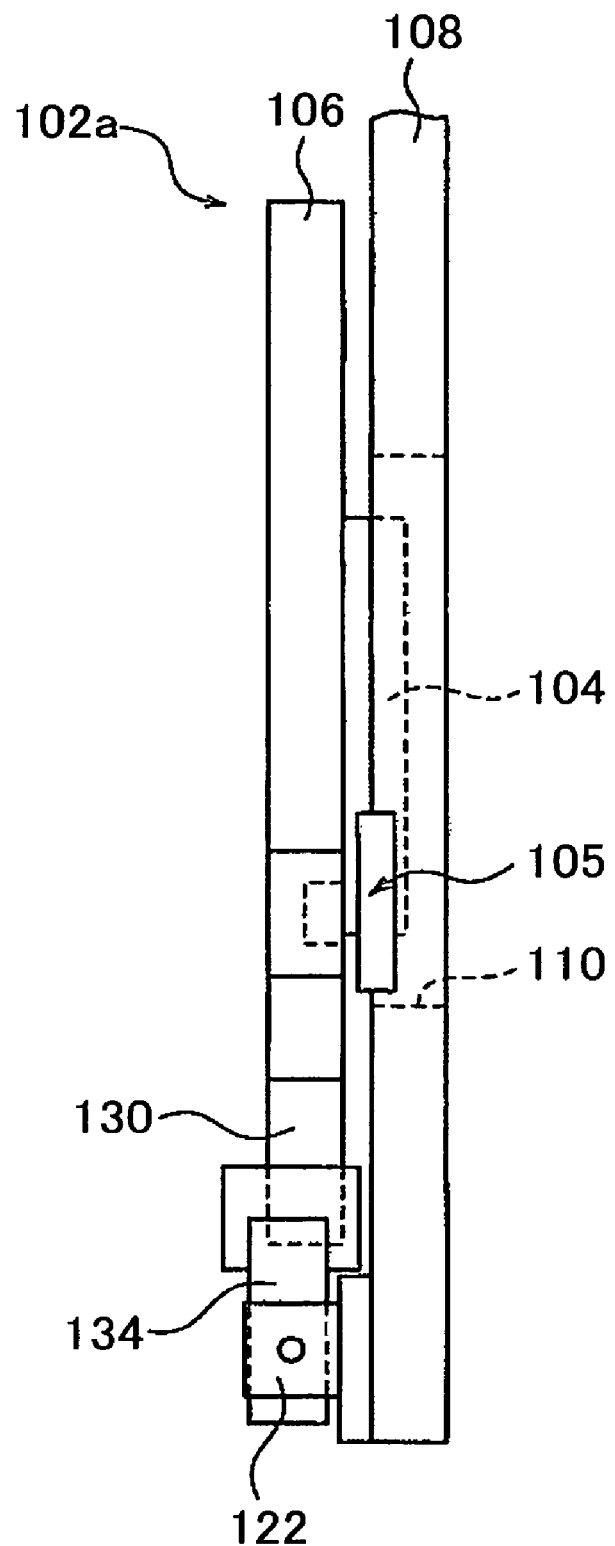
FIG. 8 is a side view of the vibration reduction apparatus illustrated in FIG. 7.
Figure 9B:
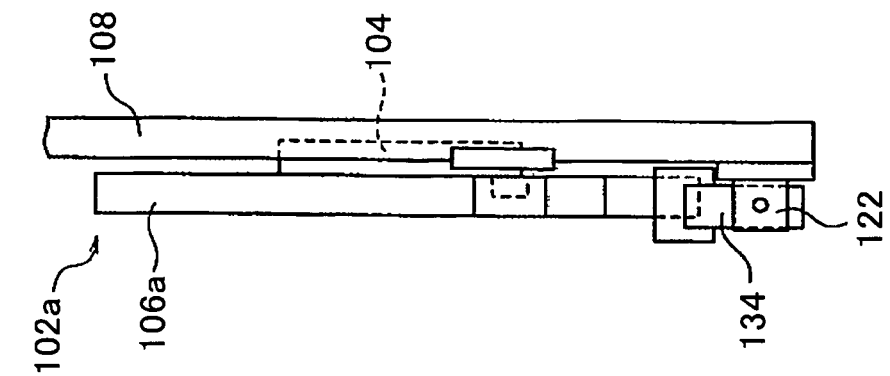
FIG. 9B is a side view of FIG. 9A.
Figure 9A:
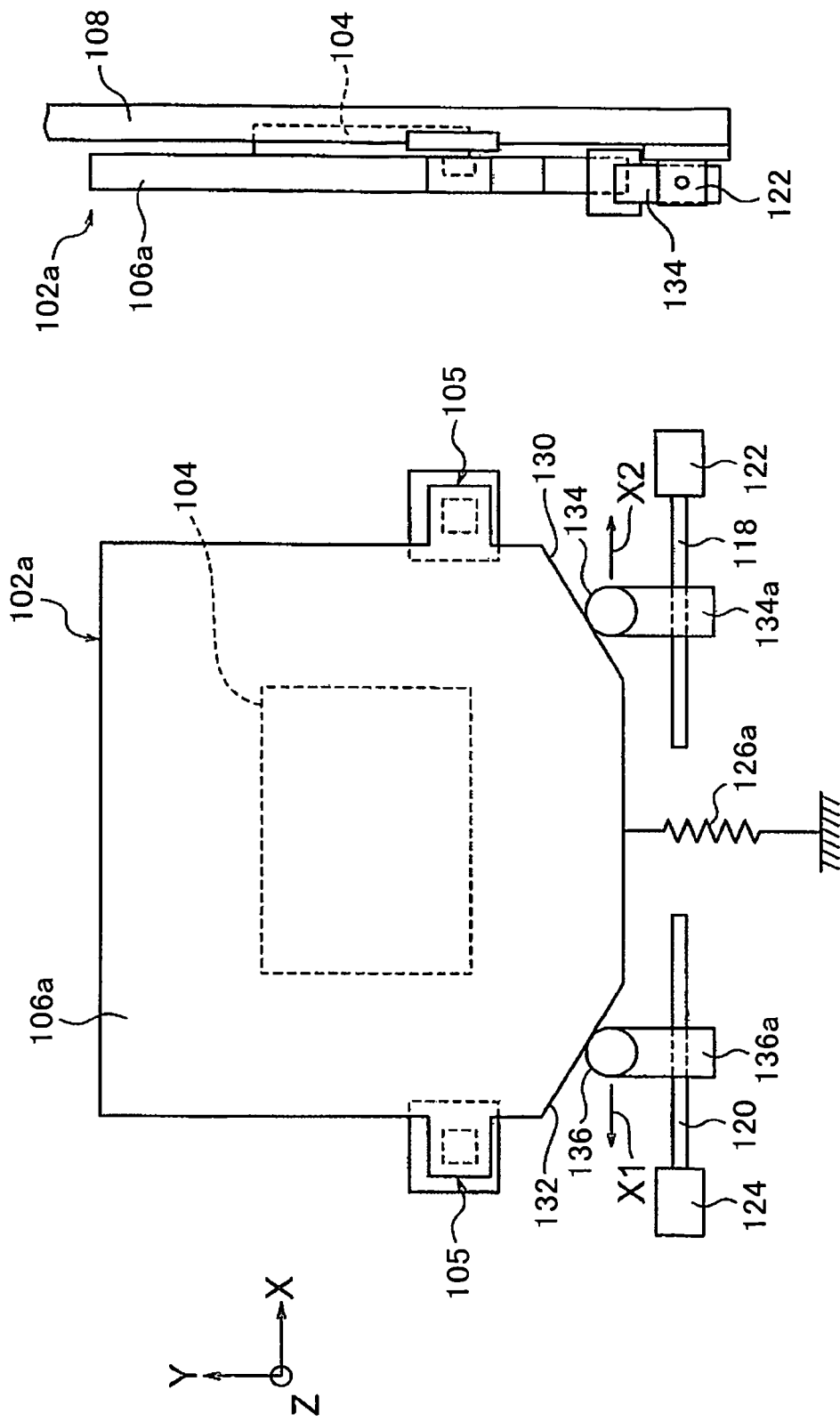
FIG. 9A is a rear view illustrating a movement of the vibration reduction apparatus of the second embodiment.

As is shown in FIG. 7 and FIG. 8, in a driving mechanism 102a of the second embodiment, two corner portions are disposed at the lower end of a movable plate 106a which retains the imaging unit 104. A first cam face 130 and a second cam face 132 are formed at the two corner portions, respectively. A first driving pin 134 and a second driving pin 136 are engaged with the cam faces 130 and 132, respectively.

A driving threaded hole member 134a is fixed to the first driving pin 134. The driving threaded rod 118 extending in the X-axis direction is threadingly engaged with the driving threaded hole member 134a. The driving threaded rod 118 is driven to turn about its own axis by the stepping motor 122. The stepping motor 122 is fixed with respect to the fixed portion 108a of the camera body 10 illustrated in FIG. 1.

A driving threaded hole member 136a is fixed to the second driving pin 136. The driving threaded rod 120 extending in the X-axis direction is threadingly engaged with the driving threaded hole member 136a. The driving threaded rod 120 is driven to turn about its own axis by the stepping motor 124. The stepping motor 124 is fixed with respect to the fixed portion 108a of the camera body 10 illustrated in FIG. 1.

One end of a spring 126a, which is disposed underneath in the Y-axis direction, is attached to a lower end central portion of the movable plate 106 such that the driving pins 134 and 136 constantly touch against the cam faces 130 and 132, respectively. The other end of the spring 126a is fixed to the fixing portion 108a of the camera body 10. The movable plate 106 is urged downward in the Y-axis direction by the spring 126a. Consequently, regardless of the relative position of the movable plate 106a with respect to the fixed portion 108, the driving pins 134 and 136 are pressed against the cam faces 130 and 132.

When driving signals are inputted to the stepping motors 122 and 124 from the antivibration driving driver 46 illustrated in FIG. 1, the driving threaded rods 118 and 120 turn in accordance with the driving signals. For example, as shown from FIG. 9A to FIG. 10A and from FIG. 9B to FIG. 10B, a driving signal is inputted to the stepping motor 122 so as to move the first driving pin 134 in direction X2 relative to the driving threaded rod 118 extending along the X axis, and a driving signal is inputted to the stepping motor 124 so as to move the second driving pin 136 in direction X1, which is the opposite direction to direction X2, by the same amount of movement as the first driving pin 134.

At this time, as shown in FIG. 10A and FIG. 10B, the driving pins 134 and 136 move the cam faces 130 and 132 that respectively engage therewith, moving upward along the inclinations of the cam faces. As a result, the movable plate 106a and the imaging unit 104 are shifted downward in the Y-axis direction relative to the fixed portion 108. When a control operation opposite to that described above is applied to the stepping motors 122 and 124, the imaging unit 104 moves upward in the Y-axis direction relative to the fixed portion 108.

In order to shift the imaging unit 104 in the X-axis direction, for example, an operation as shown from FIG. 10A to FIG. 11A and from FIG. 10B to FIG. 10B is carried out. That is, a driving signal may be inputted to the stepping motor 122 so as to move the first driving pin 134 in direction X1 relative to the driving threaded rod 118 extending along the X axis, and a driving signal may be inputted to the stepping motor 124 so as to move the second driving pin 136 in the same direction X1 by the same movement amount as the first driving pin 134. According to such control, the driving pins 134 and 136 can move the movable plate 106a together with the imaging unit 104 in the Y-axis direction, without moving along the cam faces 130 and 132 that respectively engage therewith.

By combining the above-described control operations of the stepping motors 122 and 124, it is possible to shift the imaging unit 104 to arbitrary positions of the X axis and Y axis relative to the fixed portion 108.

In the driving mechanism 102a of the second embodiment, it is preferable to provide a guide mechanism such that the movable plate 106a does not improperly turn relative to the fixed portion 108, but a guide mechanism need not be provided. For example, if a sensor that detects improper turning is provided and improper turning occurs, the stepping motors 122 and 124 may be separately controlled and the driving pins 134 and 136 moved relative to the driving threaded rods 118 and 120 in directions to correct the improper turning. Otherwise structures and operational effects of the second embodiment are similar to the driving mechanism 102 relating to the earlier described first embodiment.

Alternative Modes of the First Embodiment and the Second Embodiment

The present invention is not to be limited by the embodiments described above; many modifications are possible within the technical scope of the invention.

For example, in the embodiments described above, the position sensors 105 that are employed are constituted with Hall devices and magnets or the like, and detect X-Y relative positions of the imaging unit 104 with respect to the fixed portion 108. However, rather than employing the position sensors 105, relative positions may be calculated from data of the driving signals inputted to the stepping motors 122 and 124, rotation amounts of rotating shafts of the motors, or the like. This is possible because movement amounts of the imaging unit 104 correspond one-to-one with the driving signals inputted to the stepping motors 122 and 124.

Specifically, the body CPU 14 illustrated in FIG. 1 may store the driving signals inputted to the stepping motors 122 and 124 illustrated in FIG. 2, and calculate the X-Y relative position of the imaging unit 104 with respect to the fixed portion 108 on the basis of these input driving signals. Alternatively, sensors may be provided that continuously detect rotation amounts of the rotating shafts of the stepping motors 122 and 124, and the body CPU 14 may calculate the X-Y relative position of the imaging unit 104 with respect to the fixed portion 108 on the basis of data from these sensors.

Further, in the above-described first embodiment, two of the driving members 114 and 116 are employed. However, the cam faces 114a, 116a, 114b and 116b may be formed at four different driving members, and the respective driving members moved by separate drive sources. As the drive sources, for example, stepping motors are exemplified.

In the above-described second embodiment, the driving pins 134 and 136 and cam faces 130 and 132 illustrated in FIG. 7 may be engaged by engagement of rack and pinion gears. In this case, the cam faces 130 and 132 may be the rack gears and the driving pins 134 and 136 the pinion gears, and the pinion gears may be directly turned by stepping motors.

The above embodiments describe the use of an imaging device that moves the imaging unit 104 to perform vibration reduction, but this is not to be limiting. For example, an imaging device is possible that moves a vibration reduction lens to perform vibration reduction.

In the embodiments described above, the stepping motors 122 and 124 are employed as drive sources. Alternatively, ordinary motors, piezoelectric actuators, linear motors or the like may be employed.

Third Embodiment

Next, a driving mechanism 202 relating to a third embodiment is described. In the following descriptions, portions that are the same as in the first embodiment are assigned the same reference numerals, and descriptions thereof are not given. FIG. 1 is also an overall block diagram of a camera 200 of the third embodiment.

Figure 12:
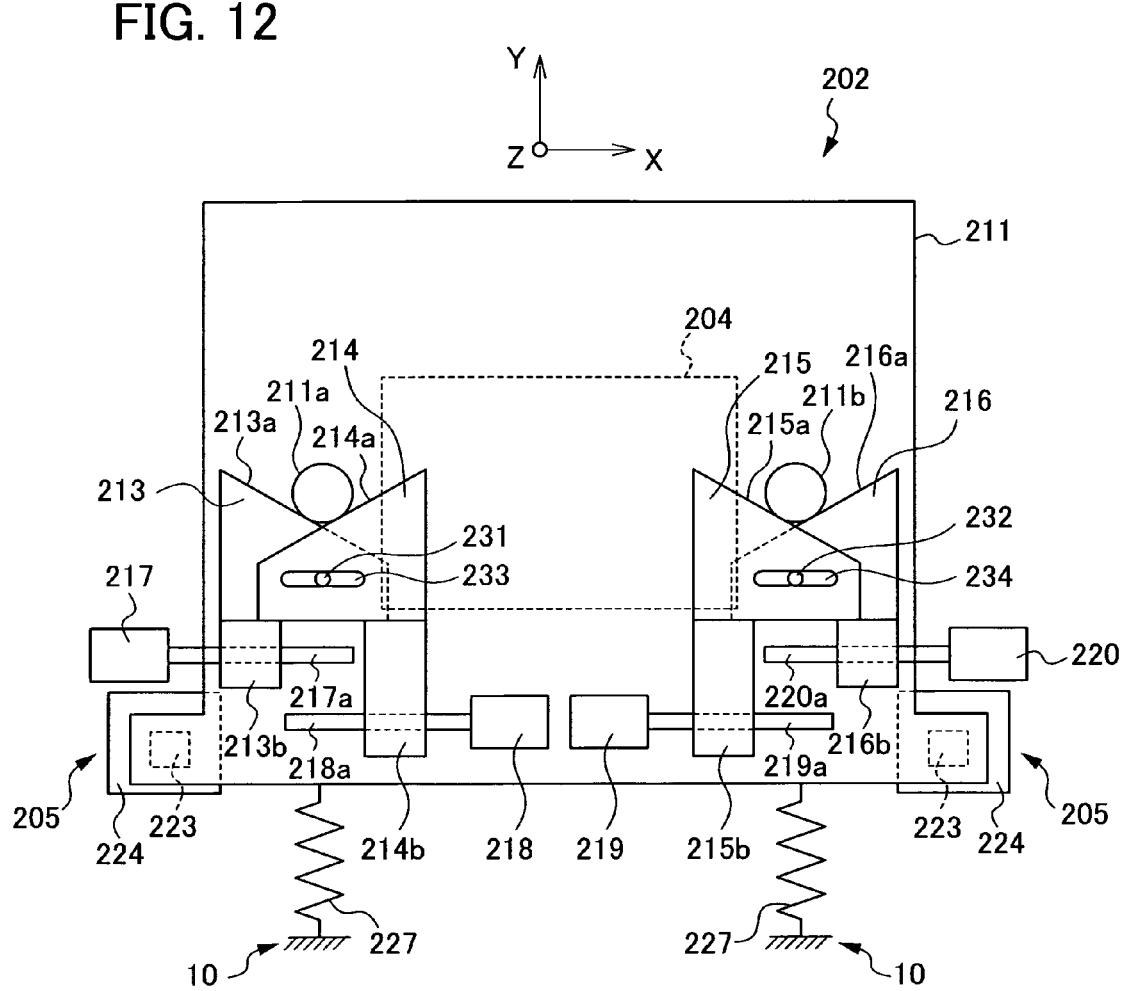
FIG. 12 is a rear view of a driving mechanism of a third embodiment.
Figure 13:
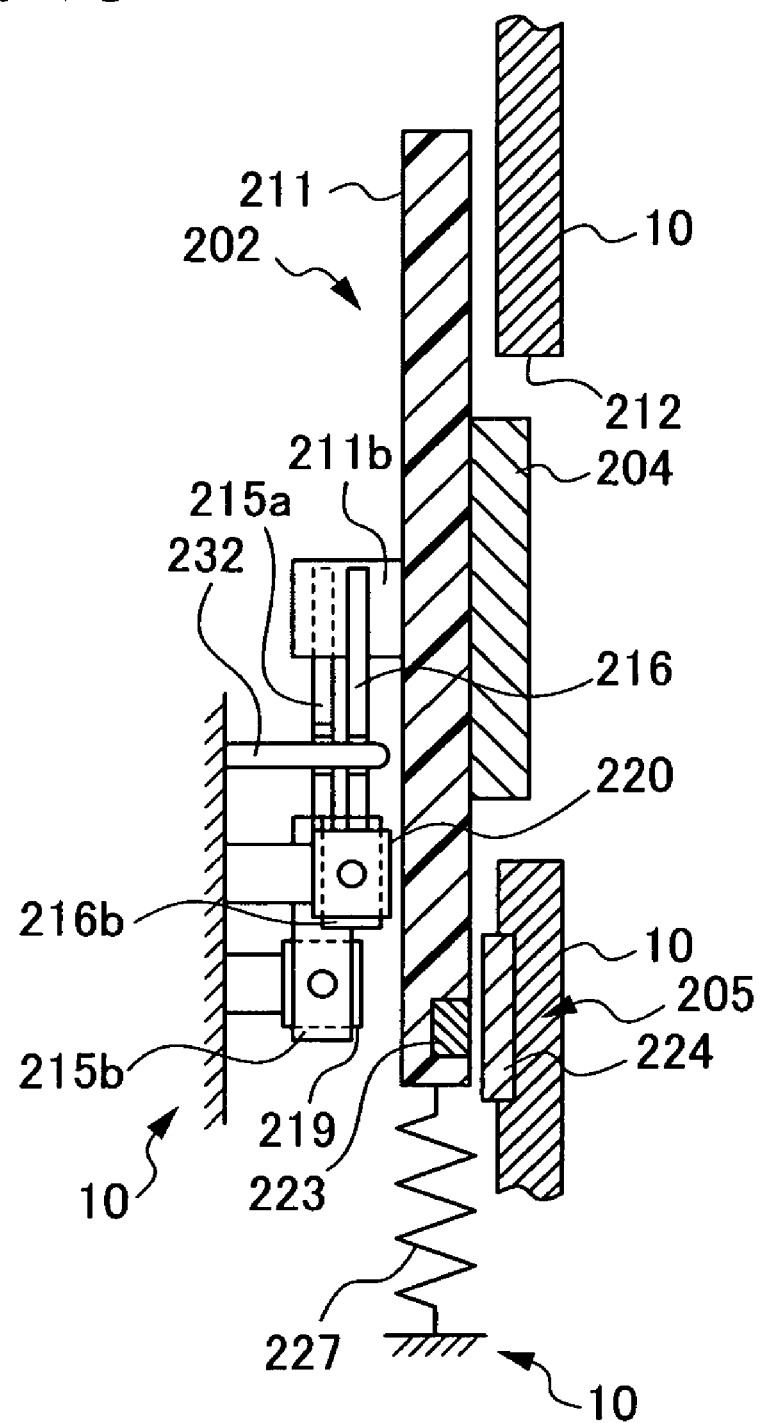
FIG. 13 is a vertical sectional view of the driving mechanism of the third embodiment.

As shown in FIG. 12 and FIG. 13, the driving mechanism 202 includes a movable plate 211, at a substantially central portion of a plate surface of which an imaging unit 204 is disposed. The movable plate 211 is retained to be movable in the X-axis and Y-axis directions relative to the camera body 10, in the X-Y plane orthogonal to the optical axis Z, and to be turnable about the optical axis Z.

As shown in FIG. 13, an opening portion 212 with an opening area greater than the profile of the imaging unit 204 is formed in the camera body 10. Thus, object light that is incident through the optical lens unit 52 illustrated in FIG. 1 is not impeded from being incident on the imaging face of the imaging unit 204. The opening area of the opening portion 212 should be significantly larger than the profile of the imaging unit 204 in order to allow the imaging unit 204 to move in the X-axis and Y-axis directions and turn about the optical axis Z in accordance with vibration reduction operations.

A set of two position sensors 205 is mounted between the camera body 10 and the movable plate 211. Thus, it is possible to detect relative positions of the movable plate 211 in the X-axis and Y-axis directions with respect to the camera body 10 and to detect turning of the movable plate 211 about the optical axis, namely rolling vibrations. In the third embodiment, the position sensors 205 are constituted by magnets 224, which are fixed at the camera body 10, and Hall devices 223, which are disposed at both left and right sides of the movable plate 211 so as to oppose the magnets 224.

A pair of a first cam pin 211a and a second cam pin 211b are fixed to a surface (hereinafter referred to as the rear face) of the movable plate 211 that is the opposite side of the surface (hereinafter referred to as the front face) at which the imaging unit 204 is mounted. At a central position in the Y-axis direction, the first cam pin 211a and second cam pin 211b are fixed at positions with a predetermined spacing in the X-axis direction. The first cam pin 211a and the second cam pin 211b protrude in the Z-axis direction, which is a direction orthogonal to the directions in which the movable plate 211 moves.

The cam pins 211a and 211b are disposed at positions which are symmetrical about the center line along the Y-axis direction of the movable plate 211. Furthermore, the cam pins 211a and 211b are disposed to be separated from one another by the predetermined spacing on the rear face of the movable plate 211 so as to be disposed outside the profile of the imaging unit 204.

A first cam 213 and a second cam 214 are arranged as a pair corresponding with the first cam pin 211a, and a third cam 215 and a fourth cam 216 are arranged as a pair corresponding with the second cam pin 211b. The cams 213, 214, 215 and 216 are formed in plate shapes. The first cam 213 and the second cam 214 are disposed to be parallel with one another, and the third cam 215 and the fourth cam 216 are disposed to be parallel with one another. Inclined faces 213a, 214a, 215a and 216a are formed at the cams 213, 214, 215 and 216. The inclined faces 213a, 214a, 215a and 216a abut against the corresponding cam pins 211a and 211b.

The inclined face (first inclined face) 213a of the first cam 213 and the inclined face (second inclined face) 214a of the second cam 214, which abut against the first cam pin 211a, are inclined at different angles so as to sandwich the first cam pin 211a. That is, the first inclined face 213a is angled downward to the right in FIG. 12, and the second inclined face 214a is angled upward to the right (i.e., downward to the left). The inclined face 215a of the third cam 215 and the inclined face 216a of the fourth cam 216, which abut against the second cam pin 211b, are similar. The third inclined face 215a is angled downward to the right in FIG. 12, and the fourth inclined face 216a is angled upward to the right (i.e., downward to the left). Thus, the second cam pin 211b is sandwiched by the inclined faces 215a and 216a. Thus, the movable plate 211 is positioned in the X-axis direction by the first cam pin 211a being sandwiched by the first inclined face 213a and the second inclined face 214a and the second cam pin 211b being sandwiched by the third inclined face 215a and the fourth inclined face 216a.

In the third embodiment, the inclined face 213a of the first cam 213 and the inclined face 215a of the third cam 215 have the same inclination angle, and the inclined face 214a of the second cam 214 and the inclined face 216a of the fourth cam 216 have the same inclination angle. Therefore, it is easy to control the heights of the first cam pin 211a and the second cam pin 211b by specifying these inclination angles.

Respective slider portions 213b, 214b, 215b and 216b are formed at the cams 213, 214, 215 and 216, respectively. The slider portions 213b, 214b, 215b and 216b extend downward (in the −Y direction) from lower portions of the respective cams 213, 214, 215 and 216. A plural number of actuators 217, 218, 219 and 220 are provided to correspond with the slider portions 213b, 214b, 215b and 216b.

The first actuator 217 corresponds with the first cam 213, the second actuator 218 corresponds with the second cam 214, the third actuator 219 corresponds with the third cam 215, and the fourth actuator 220 corresponds with the fourth cam 216. These actuators 217, 218, 219 and 220 are fixed to predetermined positions of the camera body 10, and are driven respectively separately by the antivibration driving driver 46. Piezoelectric actuators are employed as the actuators 217, 218, 219 and 220.

The actuators 217, 218, 219 and 220 include guide shafts 217a, 218a, 219a and 220a, respectively, which extend in the X-axis direction. The guide shaft 217a of the first actuator 217 passes through the slider portion 213b of the first cam 213 in an engaged state, the guide shaft 218a of the second actuator 218 passes through the slider portion 214b of the second cam 214 in an engaged state, the guide shaft 219a of the third actuator 219 passes through the slider portion 215b of the third cam 215 in an engaged state, and the guide shaft 220a of the fourth actuator 220 passes through the slider portion 216b of the fourth cam 216 in an engaged state. Because the guide shafts 217a, 218a, 219a and 220a pass through the slider portions 213b, 214b, 215b and 216b in the engaged states, when the actuators 217, 218, 219 and 220 are driven, the cams 213, 214, 215 and 216 respectively including the slider portions 213b, 214b, 215b and 216b move in the X-axis direction along the guide shafts 217a, 218a, 219a and 220a.

In the third embodiment, the actuators 217, 218, 219 and 220 that drive the cams 213, 214, 215 and 216 are all disposed to be parallel along the X-axis. Therefore, compared with a case in which the actuators 217, 218, 219 and 220 are arranged in different directions, more accurate positioning is possible.

A pair of urging springs 227 are disposed below the movable plate 211 in the Y-axis direction. One ends of the urging springs 227 are anchored at the movable plate 211. The other ends of the pair of urging springs 227 are anchored at the camera body 10. Thus, the movable plate 211 is urged downward in the Y-axis direction. Tension springs are employed as the urging springs 227. Thus, the first cam pin 211a is pressed against a region of intersection of the inclined face 213a of the first cam 213 and the inclined face 214a of the second cam 214, and the second cam pin 211b is pressed against a region of intersection of the inclined face 215a of the third cam 215 and the inclined face 216a of the fourth cam 216. Therefore, the movable plate 211 is retained at a predetermined position.

Guide rods 231 and 232 are provided in order to guide movements of the cams 213, 214, 215 and 216 in the X-axis direction. The guide rod 231 is disposed at the first cam 213 and the second cam 214, and the guide rod 232 is disposed at the third cam 215 and the fourth cam 216. The guide rods 231 and 232 are provided at the camera body 10 so as to protrude in the Z-axis direction orthogonally to the X axis.

Guide slits 233 and 234 are formed in the cams 213, 214, 215 and 216 to correspond with the guide rods 231 and 232. The guide slits 233 are formed such that the first cam 213 and the second cam 214 to be overlap thereat, and the guide slits 234 are formed such that the third cam 215 and the fourth cam 216 overlap thereat. The guide slits 233 and 234 extend in the X-axis direction, and the cams 213, 214, 215 and 216 slide over the guide rods 231 and 232 when moving in the X-axis direction. Therefore, linear movement of the cams 213, 214, 215 and 216 is guided in the X-axis direction, and linear movement in the X-axis direction can be stably implemented.

Figure 14:
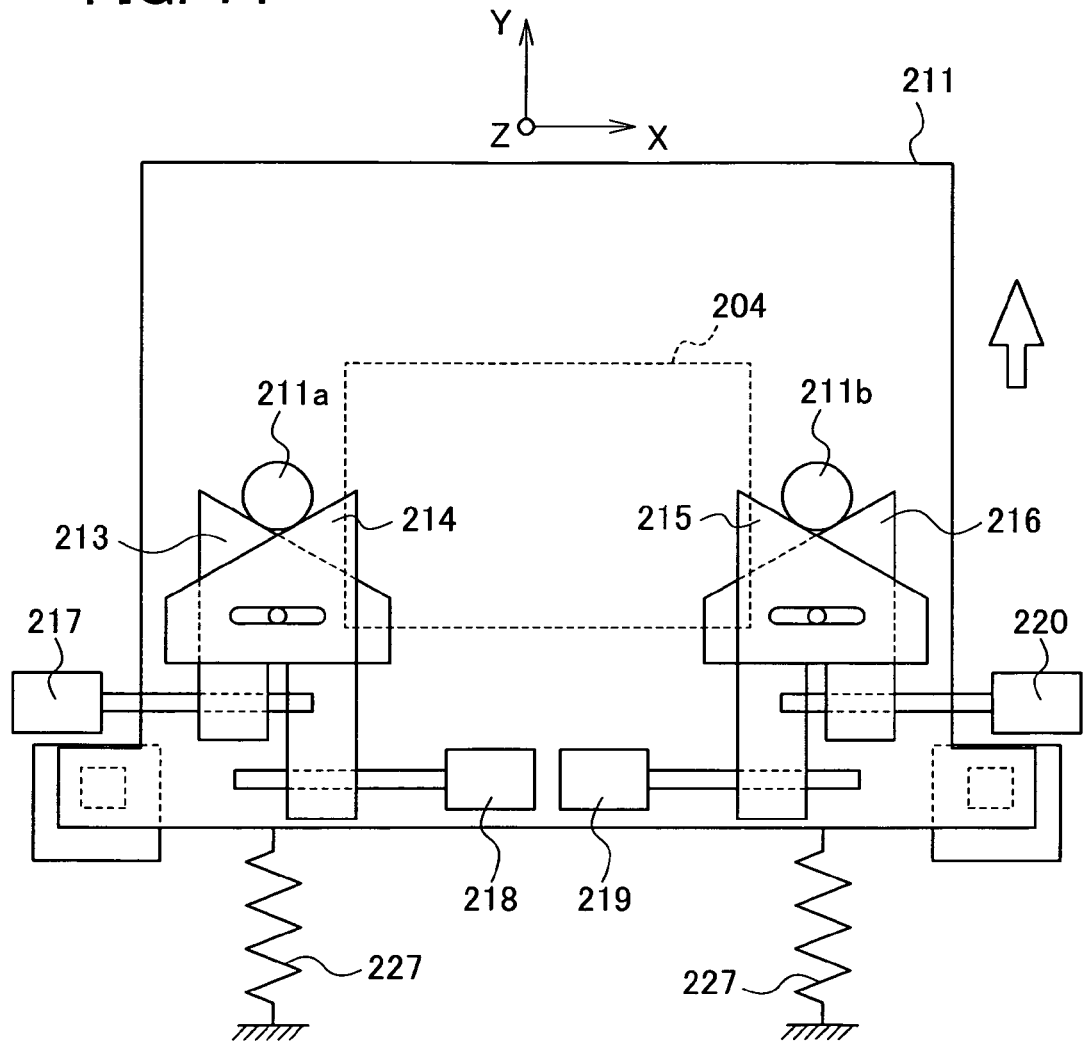
FIG. 14 is a rear view illustrating an operation for performing Y-axis correction of the driving mechanism of the third embodiment.

Next, operation of the third embodiment is described. FIG. 12 illustrates a case in which the movable plate 211 is at an initial position. When the movable plate 211 is to be shifted upward (in the +Y direction), driving signals are outputted to the four actuators 217, 218, 219 and 220 from the antivibration driving driver 46, and the actuators 217, 218, 219 and 220 are driven. That is, the first actuator 217 drives such that the first cam 213 moves linearly in the +X direction and, at the same time, the second actuator 218 drives such that the second cam 214 moves linearly in the −X direction. Meanwhile, the third actuator 219 drives such that the third cam 215 moves linearly in the +X direction and, at the same time, the fourth actuator 220 drives such that the fourth cam 216 moves linearly in the −X direction. As shown in FIG. 14, when the cams 213, 214, 215 and 216 move in the X-axis direction, the first cam pin 211a and the second cam pin 211b are pushed up in the +Y direction. Therefore, the movable plate 211 rises in the +Y direction, and the imaging unit 204 rises in the same direction.

When the movable plate 211, which is to say the imaging unit 204, is to be shifted in the X direction, this can be done by moving all of the cams 213, 214, 215 and 216 in the left-right direction at the same speed.

Figure 15:
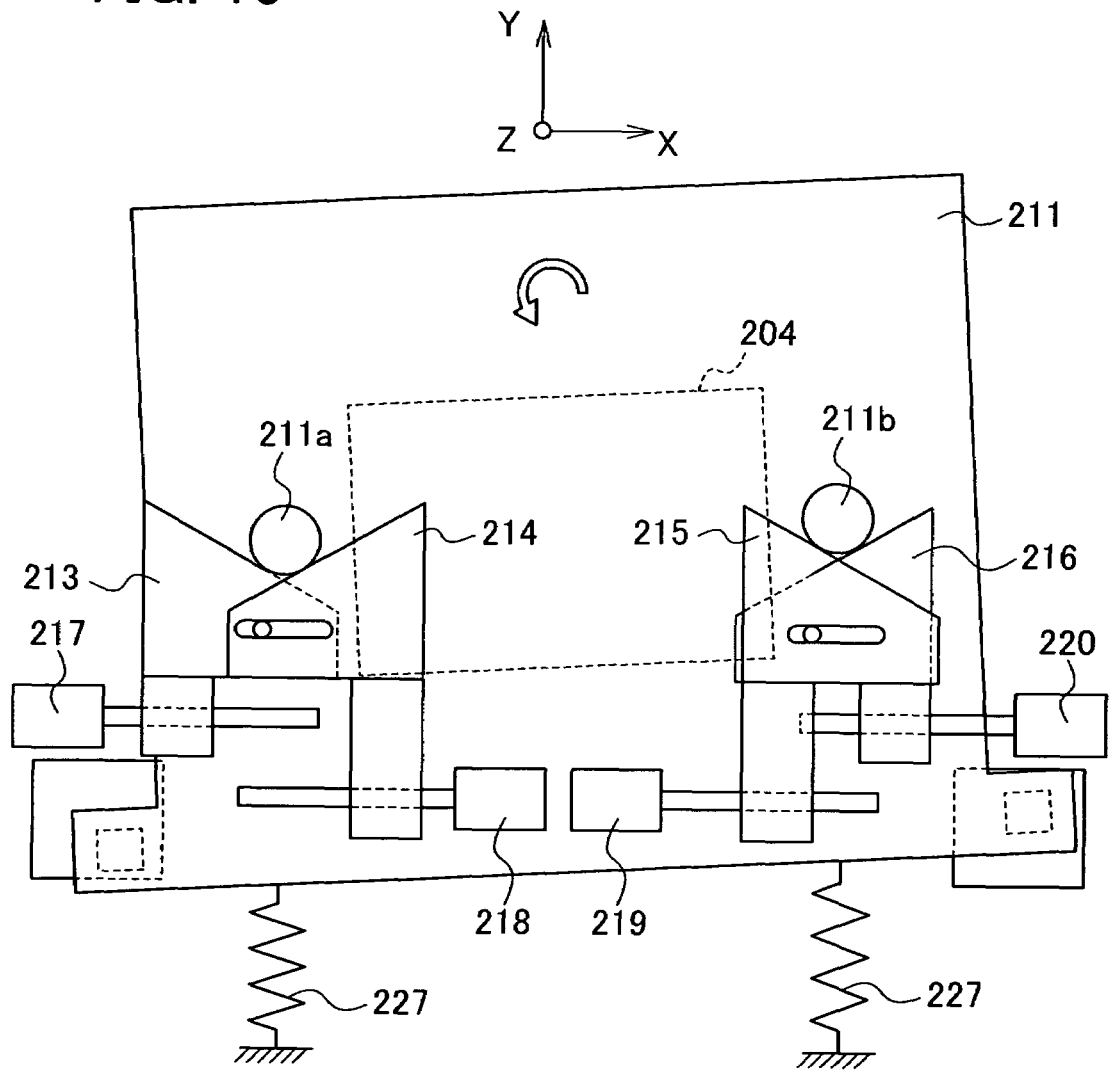
FIG. 15 is a rear view illustrating a rolling vibration correction operation of the driving mechanism of the third embodiment.

When a rolling vibration of the movable plate 211 is to be corrected, as shown in FIG. 15, the first actuator 217 drives such that the first cam 213 moves linearly in the −X direction, and the second actuator 218 drives such that the second cam 214 moves linearly in the +X direction. Meanwhile, the third actuator 219 drives such that the third cam 215 moves linearly in the +X direction, and the fourth actuator 220 drives such that the fourth cam 216 moves linearly in the −X direction. The first cam pin 211a is lowered by the combined action of the cams 213 and 214, and the second cam pin 211b is raised by the combined action of the cams 215 and 216. Therefore, the movable plate 211 turns in the anticlockwise direction about the optical axis (the Z axis). Consequently, the imaging unit 204 turns in the same direction, and the rolling vibration can be corrected.

It is possible to turn the movable plate 211 in the clockwise direction by moving the first cam 213 in the +X direction and moving the second cam 214 in the −X direction to raise the first cam pin 211a, and moving the third cam 215 in the −X direction and moving the fourth cam 216 in the +X direction to lower the second cam pin 211b. Thus, a rolling vibration can be corrected.

In this third embodiment, control of the actuators 217, 218, 219 and 220 is feedback control: relative X-Y positions of the imaging unit 204 with respect to the camera body 10 and vibrations about the optical axis are detected on the basis of output signals of the position sensors 205, and control is carried out on the basis of the detection signals.

According to the third embodiment described hereabove, the following effects are present.

(1) In the driving mechanism 202 of the third embodiment, all of the cams 213, 214, 215 and 216 are arranged in the same direction along the X axis, the position of the movable plate 211 are set at the positions of the cam pins 211a and 211b by regions of intersection of the inclined faces of the cams 213, 214, 215 and 216. Therefore, the imaging unit 204 can be moved accurately.

(2) Because the actuators 217, 218, 219 and 220 for driving the cams 213, 214, 215 and 216 can be arranged along the X direction, there is no need for the movable plate 211 to be formed in two levels, the overall device may be made thinner (smaller), and this contributes to a reduction in the number of components.

(3) The driving mechanism 202 of the third embodiment does not need a gear train, a linking mechanism or the like. Rather, with the constitution in which the imaging unit 204 is moved by the pair of cam pins 211a and 211b, the cams 213, 214, 215 and 216 and the actuators 217, 218, 219 and 220, the number of components may be reduced, and weight may be lightened and manufacturing costs lowered.

(4) In the driving mechanism 202 of the third embodiment, when control of the vibration reduction apparatus stops or when the provision of electricity to the actuators 217, 218, 219 and 220 stops, the movable plate 211 maintains the state thereof at the time of stopping. Therefore, in contrast to a conventional example in which the movable plate 211 is moved by electromagnetic force, a locking mechanism for fixing the relative position of the imaging unit 204 at a time of control stopping, a time of provision of electricity stopping or the like is not required.

(5) In the driving mechanism 202 of the third embodiment, because the movable plate 211 can be turned about the optical axis as well as being moved in parallel with a fixed portion, correction of rolling vibrations is possible. Therefore, vibration reduction is possible for shaking in all directions beside the optical axis direction. In addition, this embodiment is applicable for correction of rotation of a camera other than correction of rolling vibrations caused by hand wobbling. For example, this embodiment can be applied to correct such an inclination of a camera as detected by an angle sensor contained in the camera.

Alternative Modes of the Third Embodiment

The present invention is not to be limited by the embodiment described above; many modifications and alterations such as illustrated below are possible, and these are also within the technical scope of the present invention.

(1) In the third embodiment, the position of the imaging unit 204 is detected using the position sensors 205 that are constituted with Hall devices and magnets or the like. However, rather than employing the position sensors 205, relative positions may be calculated from the driving signals that are inputted to the piezoelectric actuators that move the movable plate 211, or the like. This is possible because movement amounts of the imaging unit 204 correspond one-to-one with the driving signals inputted to the actuators 217, 218, 219 and 220. Specifically, the body CPU 14 illustrated in FIG. 1 may store the driving signals inputted to the actuators 217, 218, 219 and 220 illustrated in FIG. 12, and calculate the position of the imaging unit 204 with respect to the camera body 10 on the basis of these input driving signals.

(2) The above embodiment describes a driving mechanism that drives the imaging unit 204 in order to perform vibration reduction, but this is not to be limiting. For example, an imaging device is possible that moves a vibration reduction lens to perform vibration reduction.

(3) In the embodiment described above, piezoelectric actuators are employed as the actuators 217, 218, 219 and 220. However, this is not to be limiting, and linear motors may be employed.

(4) Turning members such as rollers may be employed as the cam pins 211a and 211b, and thus friction may be reduced.

(5) Springs other than tension springs may be employed as the urging springs 227, provided the springs urge the movable plate 211 in the Y direction.

(6) In the embodiment described above, application to a camera is illustrated, but this is not to be limiting. The optical equipment may be other optical equipment such as a mobile phone equipped with an imaging function or the like.

Fourth Embodiment

Next, a driving mechanism 302 relating to a fourth embodiment is described. In the following descriptions, portions that are the same as in the first embodiment are assigned the same reference numerals, and descriptions thereof are not given. FIG. 1 is also an overall block diagram of a camera 300 of the fourth embodiment.

Figure 16:
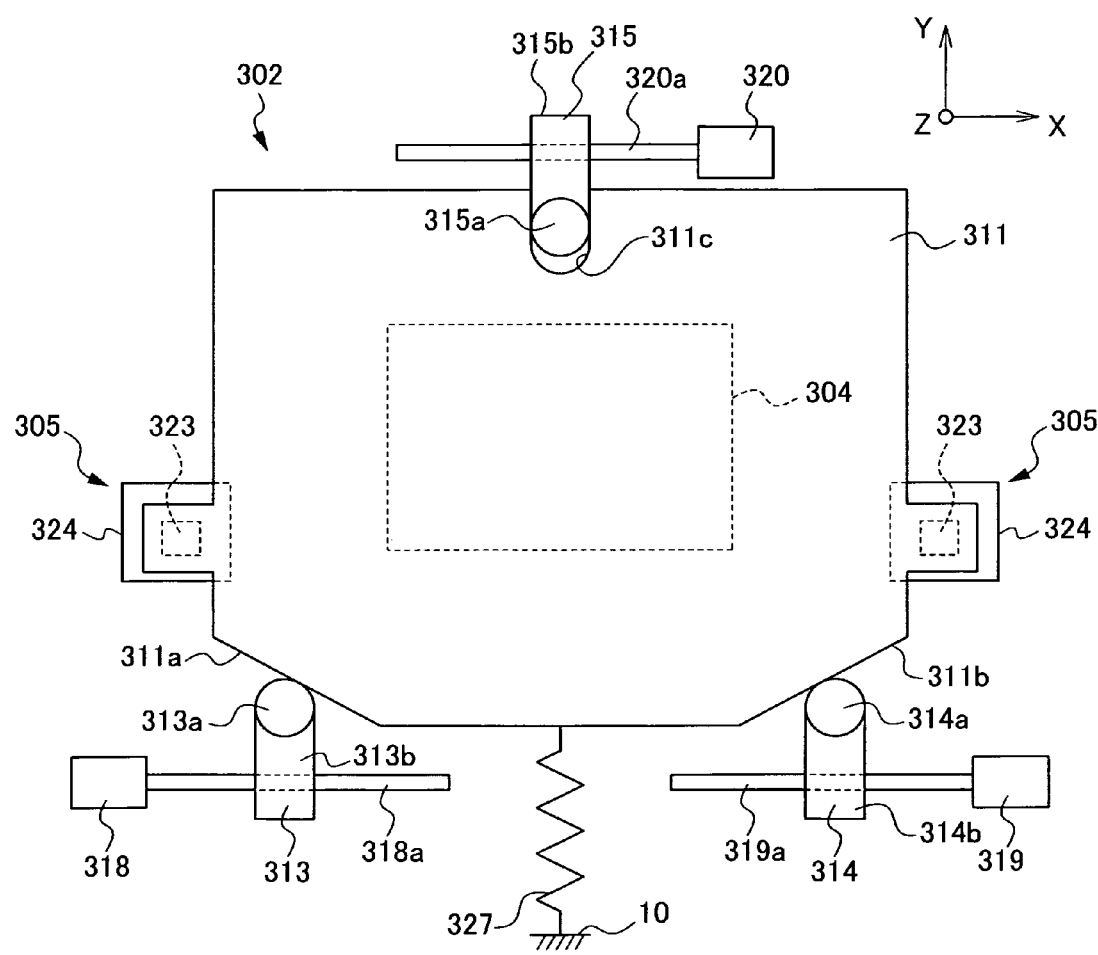
FIG. 16 is a rear view of a driving mechanism of a fourth embodiment.
Figure 17:
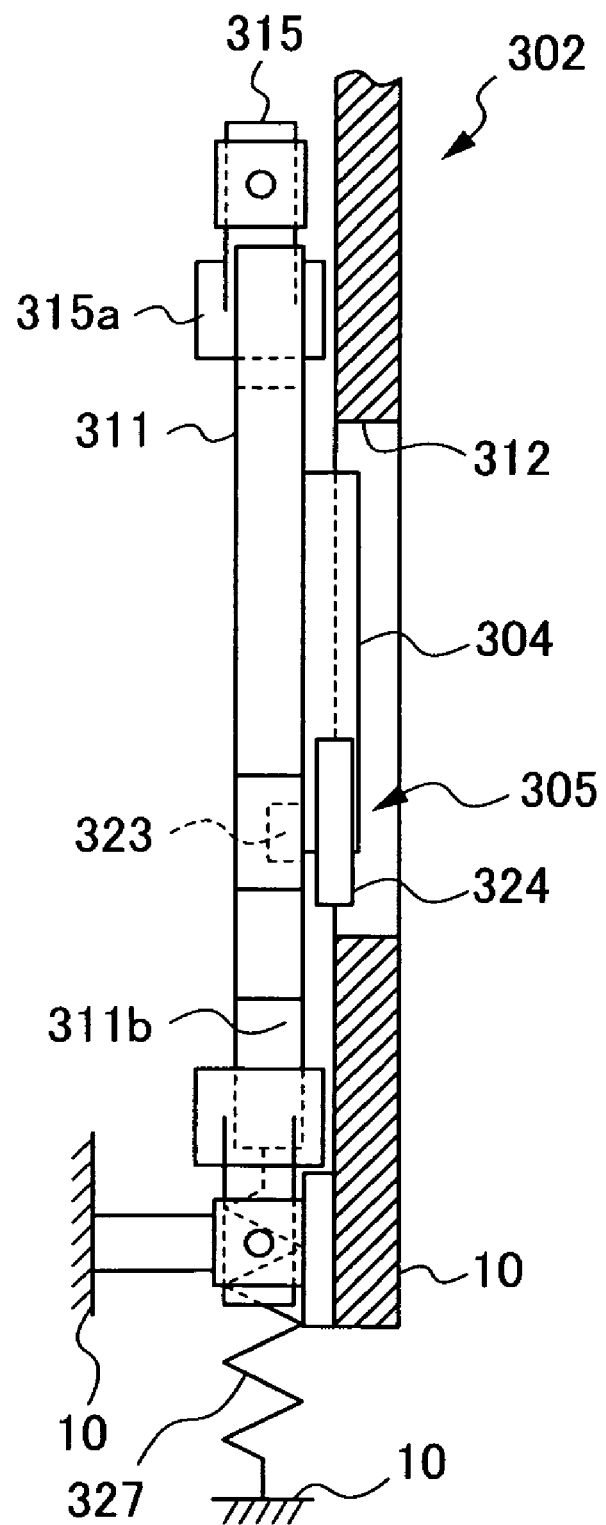
FIG. 17 is a vertical sectional view of the driving mechanism of the fourth embodiment.

As shown in FIG. 16 and FIG. 17, the driving mechanism 302 includes a movable plate 311, at a substantially central portion of a plate surface of which an imaging unit 304 is disposed. The movable plate 311 is retained to be movable in the X-axis and Y-axis directions relative to the camera body 10, in the plane orthogonal to the optical axis Z, and to be turnable about the optical axis Z.

An opening portion 312 with an opening area greater than the profile of the imaging unit 304 is formed in the camera body 10. Thus, object light that is incident through the optical lens unit 52 illustrated in FIG. 1 is not impeded from being incident on the imaging face of the imaging unit 304. The opening area of the opening portion 312 should be significantly larger than the profile of the imaging unit 304 in order to allow the imaging unit 304 to move in the X-axis and Y-axis directions and turn about the optical axis Z in accordance with vibration reduction operations.

A set of two position sensors 305 is mounted between the camera body 10 and the movable plate 311. Thus, it is possible to detect relative positions of the movable plate 311 in the X-axis and Y-axis directions with respect to the camera body 10 and to detect turning of the movable plate 311 about the optical axis, namely rolling vibrations. In the fourth embodiment, the position sensors 305 are constituted by magnets 324, which are fixed at the camera body 10 so as to oppose each of left and right end portions of the movable plate 311, and Hall devices 323, which are disposed at the left and right end portions of the movable plate 311 so as to oppose the magnets 324.

A first cam face 311a and a second cam face 311b are formed in the left-right direction (the X-axis direction) at the lower end side (the −Y side) of the movable plate 311. The cam faces 311a and 311b are formed at symmetrical positions about the center line along the Y axis of the movable plate 311.

The first cam face 311a is a down-rightward inclined face which is angled downward in the +X direction, and the second cam face 311b is an up-rightward inclined face which is angled upward in the +X direction. The first cam face 311a and the second cam face 311b are inclined at substantially the same angle, in opposite directions, with respect to the Y-axis direction (the direction of the above-mentioned centerline).

In addition to the above-mentioned cam faces 311a and 311b, a cam slit 311c is formed at an upper end portion of the movable plate 311 (the +Y side end portion). The cam slit 311c is formed at substantially the middle of the upper end portion of the movable plate 311, so as to extend linearly substantially in the vertical direction (the Y-axis direction).

A first slider 313 and a second slider 314 are disposed at the first cam face 311a and the second cam face 311b, respectively. The sliders 313 and 314 include slider portions 313b and 314b, which extend in the Y-axis direction, and a circular arc-form first pin 313a and second pin 314a, which protrude from end portions of the slider portions 313b and 314b, respectively. The first pin 313a and second pin 314a extend in the Z direction. The first pin 313a abuts against the first cam face 311a of the movable plate 311, and the second pin 314a abuts against the second cam face 311b.

A third slider 315 is disposed in correspondence with the cam slit 311c. The third slider 315 also includes a slider portion 315b, which extends in the Y-axis direction, and a circular arc-form pin 315a which protrudes from an end portion of the slider portion 315b. The pin 315a has a diameter substantially equal to the width of the cam slit 311c, and is inserted into the cam slit 311c so as to fit tightly against an inner face of the cam slit 311c.

Actuators 318, 319 and 320 are disposed in correspondence with the first slider 313, the second slider 314 and the third slider 315, respectively. That is, the first actuator 318 is disposed in correspondence with the first slider 313, the second actuator 319 is disposed in correspondence with the second slider 314, and the third actuator 320 is disposed in correspondence with the third slider 315. These actuators 318, 319 and 320 are fixed to predetermined positions of the camera body 10. The actuators 318, 319 and 320 are controlled by the antivibration driving driver 46 and are each driven respectively separately. Piezoelectric actuators are employed as the actuators 318, 319 and 320.

The actuators 318, 319 and 320 include guide shafts 318a, 319a and 320a, respectively, which extend in the X-axis direction. The guide shaft 318a of the first actuator 318 passes through the slider portion 313b of the first slider 313 in an engaged state, The guide shaft 319a of the second actuator 319 passes through the slider portion 314b of the second slider 314 in an engaged state, and the guide shaft 320a of the third actuator 320 passes through the slider portion 315b of the third slider 315 in an engaged state. Because the guide shafts 318a, 319a and 320a pass through the slider portions 313b, 314b and 315b in the engaged states, when the actuators 318, 319 and 320 are driven, the sliders 313, 314 and 315 including the respective slider portions 313b, 314b and 315b move in the X-axis direction along the guide shafts 318a, 319a and 320a.

In the fourth embodiment, the actuators 318, 319 and 320 that drive the sliders 313, 314 and 315 are all arranged along the X axis. Therefore, compared with a case in which the actuators 318, 319 and 320 are arranged in different directions, more accurate positioning is possible.

An urging spring 327 is disposed below the movable plate 311 in the Y-axis direction. One end of the urging spring 327 is anchored at a substantially central region in the lateral direction (X-axis direction) of the movable plate 311, and the other end of the urging spring 327 is anchored at the camera body 10. Thus, the movable plate 311 is urged downward in the Y-axis direction by the urging spring 327. A tension spring is employed as the urging spring 327. The first cam face 311a is pressed against the first pin 313a of the first slider 313 and the second cam face 311b is pressed against the second pin 314a of the second slider 314 by the urging force of the urging spring 327. Therefore, the movable plate 311 is stable and is positioned.

Figure 18:
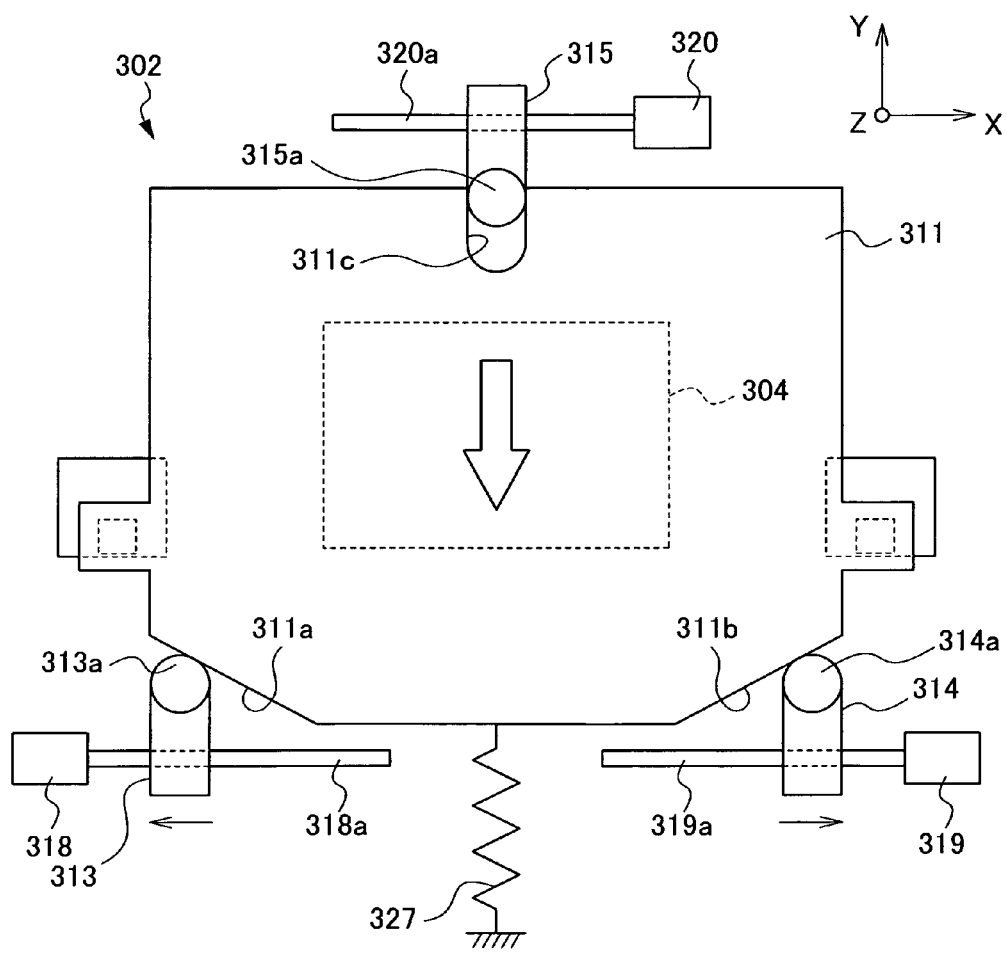
FIG. 18 is a rear view illustrating an operation for performing Y-axis correction of the fourth embodiment.

Next, operation of the fourth embodiment is described. FIG. 16 illustrates a case in which the movable plate 311 is at an initial position. When the movable plate 311 is to be shifted downward (in the −Y direction), driving signals are outputted to the first actuator 318 and the second actuator 319 from the antivibration driving driver 46, and the actuators 318 and 319 are driven. That is, the first actuator 318 drives such that the first slider 313 moves linearly in the −X direction and, at the same time, the second actuator 319 drives such that the second slider 314 moves linearly in the +X direction at the same speed. At this time, the third actuator 320 is in a stopped state in which driving is not being conducted. As shown in FIG. 18, when the first slider 313 and second slider 314 move in the X-axis direction, the first cam face 311a and second cam face 311b are pulled down in the −Y direction. Therefore, the movable plate 311 descends in the −Y direction, and the imaging unit 304 descends in the same direction.

When the movable plate 311, which is to say the imaging unit 304, is to be shifted in the +Y direction, this can be done by moving the first slider 313 linearly in the +X direction and moving the second slider 314 linearly in the −X direction at the same speed.

Figure 19:
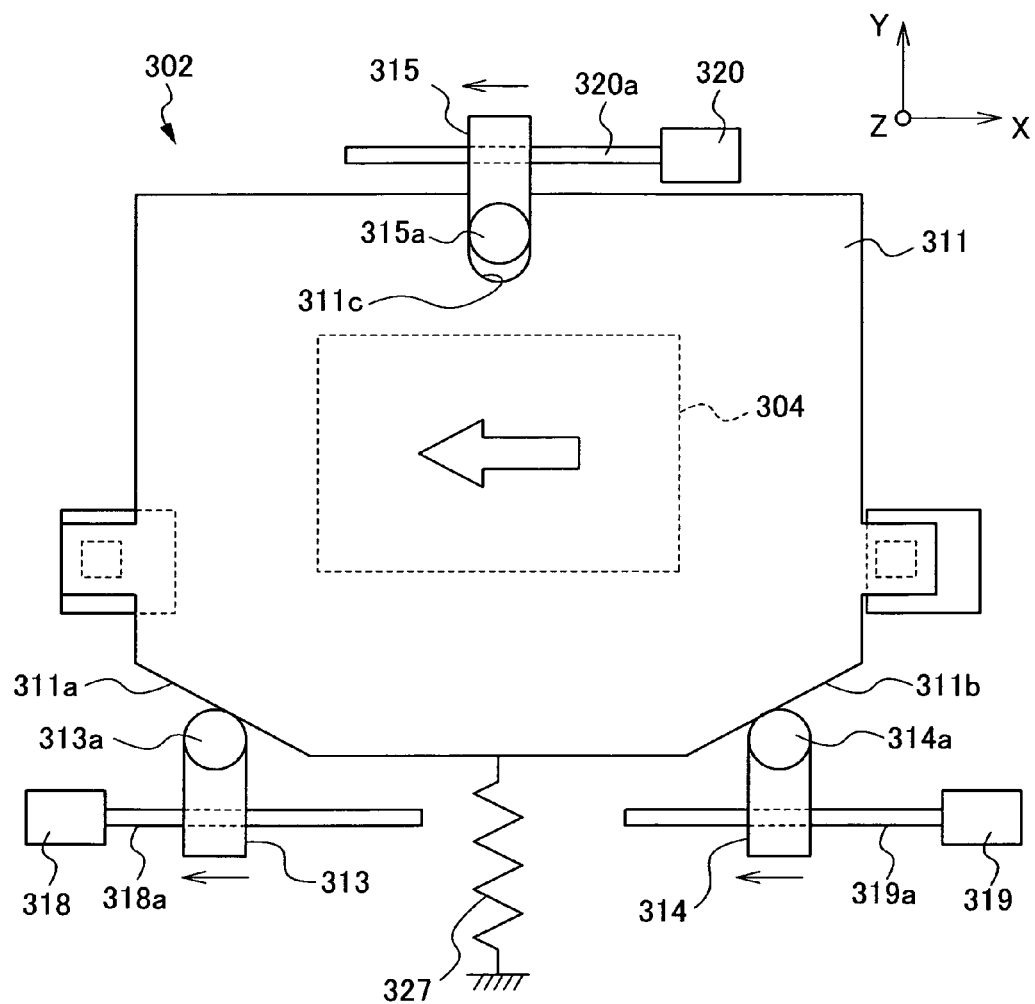
FIG. 19 is a rear view illustrating an operation for performing X-axis correction of the fourth embodiment.

When the movable plate 311, which is to say the imaging unit 304, is to be shifted leftward (in the −X direction), driving signals are outputted to the three actuators 318, 319 and 320 from the antivibration driving driver 46 and the actuators are respectively separately driven. That is, as shown in FIG. 19, the first actuator 318 is driven such that the first slider 313 moves linearly in the −X direction and the second actuator 319 is driven such that the second slider 314 moves linearly in the −X direction at the same speed as the first slider 313. Meanwhile, the third actuator 320 is driven such that the third slider 315 moves linearly, at the same speed again, in the −X direction. When the sliders 313, 314 and 315 move in the −X direction, the movable plate 311 moves leftward (in the −X direction), and the imaging unit 304 moves in the same direction.

When the movable plate 311, including the imaging unit 304, is to be shifted in the +X direction, this can be done by moving the first slider 313, the second slider 314 and the third slider 315 linearly in the +X direction.

Figure 20:
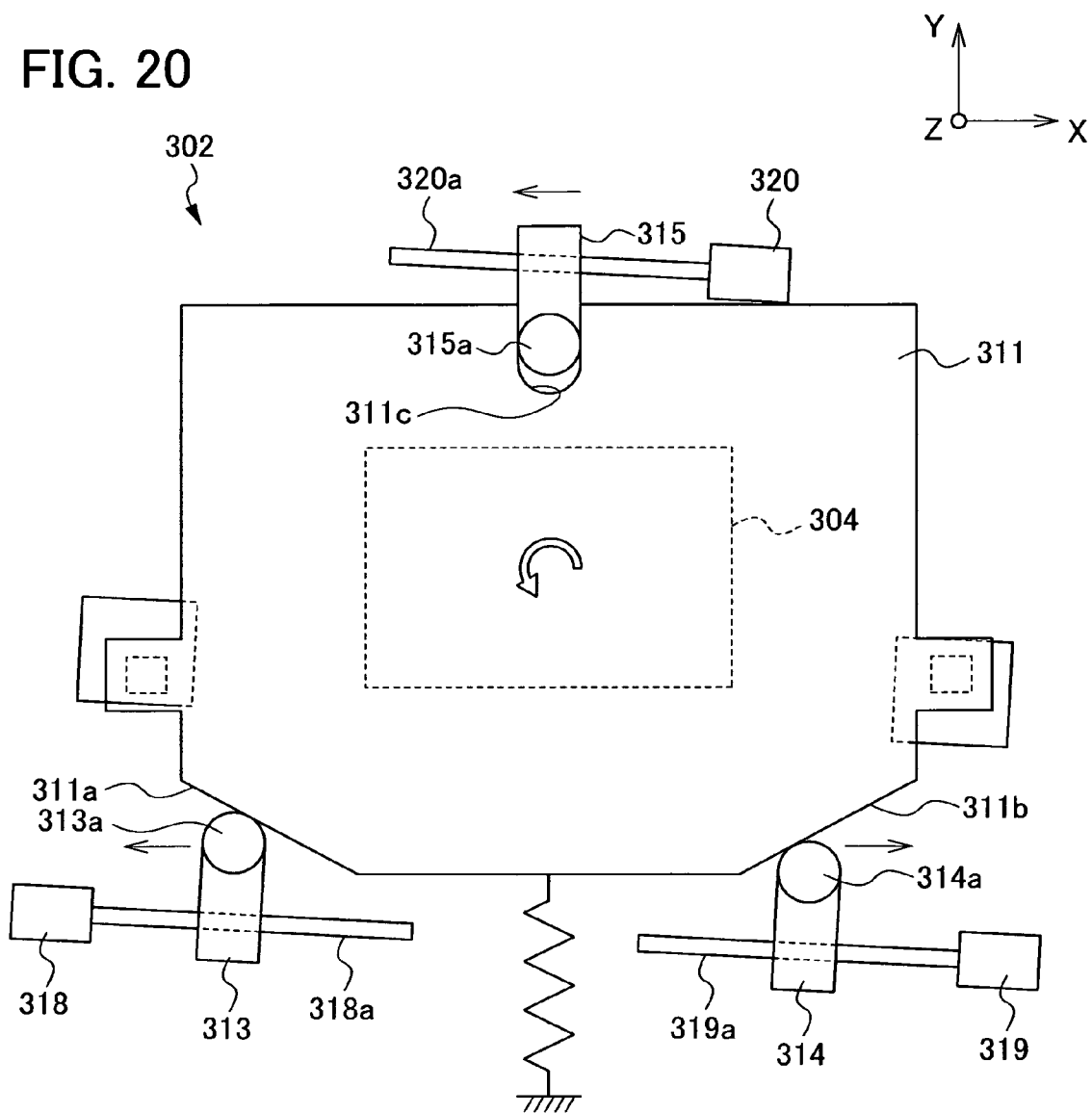
FIG. 20 is a rear view illustrating an operation of correcting a rolling vibration of the fourth embodiment.

When a rolling shake of the movable plate 311 is to be corrected, as shown in FIG. 20, the first actuator 318 is driven such that the first slider 313 moves linearly in the −X direction, and the second actuator 319 is driven such that the second slider 314 moves linearly in the +X direction. Additionally, the third actuator 320 is driven such that the third slider 315 moves linearly in the +X direction. The movable plate 311 is turned in the anticlockwise direction about the optical axis (the Z axis) by the combination of movements of the sliders 313, 314 and 315. Consequently, the imaging unit 304 turns in the same direction, and the rolling shake can be corrected.

It is possible to turn the movable plate 311 in the clockwise direction by driving the respective actuators 318, 319 and 320 such that the first slider 313 moves in the +X direction, the second slider 314 moves in the −X direction and the third slider 315 moves in the +X direction.

In this fourth embodiment, information on the absolute position and inclination of the movable plate 311 is detected by the position sensors 305 and feedback is performed. Therefore, irregularities of the components and slight positional errors caused by machining inaccuracy can be corrected, and highly accurate driving control is possible.

According to the fourth embodiment described hereabove, the following effects are present.

(1) In the driving mechanism 302 of the fourth embodiment, movement of the movable plate is carried out with the first slider 313 and the second slider 314 being disposed along the X axis and the third slider 315 being disposed along the Y axis othogonal to the X axis. Therefore, the imaging unit 304 can be moved with high positional accuracy.

(2) Because the actuators 318, 319 and 320 for driving the three sliders 313, 314 and 315 can be arranged along the X axis, there is no need for the movable plate 311 to be formed in two levels, the overall device may be made thinner (smaller), and this contributes to a reduction in the number of components.

(3) The driving mechanism 302 of the fourth embodiment does not need a gear train, a linking mechanism or the like. Rather, with the constitution in which the imaging unit 304 is moved by the sliders 313, 314 and 315 and the actuators 318, 319 and 320, the number of components may be reduced, and weight may be lightened and manufacturing costs lowered.

(4) In the driving mechanism 302 of the fourth embodiment, when control of the vibration reduction apparatus stops-or when the provision of electricity to the actuators 318, 319 and 320 stops, the movable plate 311 maintains the state thereof at the time of stopping. Therefore, in contrast to a conventional example in which the movable plate 311 is moved by electromagnetic force, a locking mechanism for fixing the relative position of the imaging unit 304 at a time of control stopping, a time of provision of electricity stopping or the like is not required.

(5) In the driving mechanism 302 of the fourth embodiment, because the movable plate 311 can be turned about the optical axis as well as being moved in parallel with a fixed portion, correction of rolling vibrations is possible. Therefore, vibration reduction is possible for shaking in all directions beside the optical axis direction. In addition, this embodiment is applicable for correction of rotation of a camera other than correction of rolling vibrations caused by hand wobbling. For example, this embodiment can be applied to correct such an inclination of a camera as detected by an angle sensor contained in the camera.

Alternative Modes of the Fourth Embodiment

The present invention is not to be limited by the embodiment described above; many modifications and alterations such as illustrated below are possible, and these are also within the technical scope of the present invention.

Figure 21:
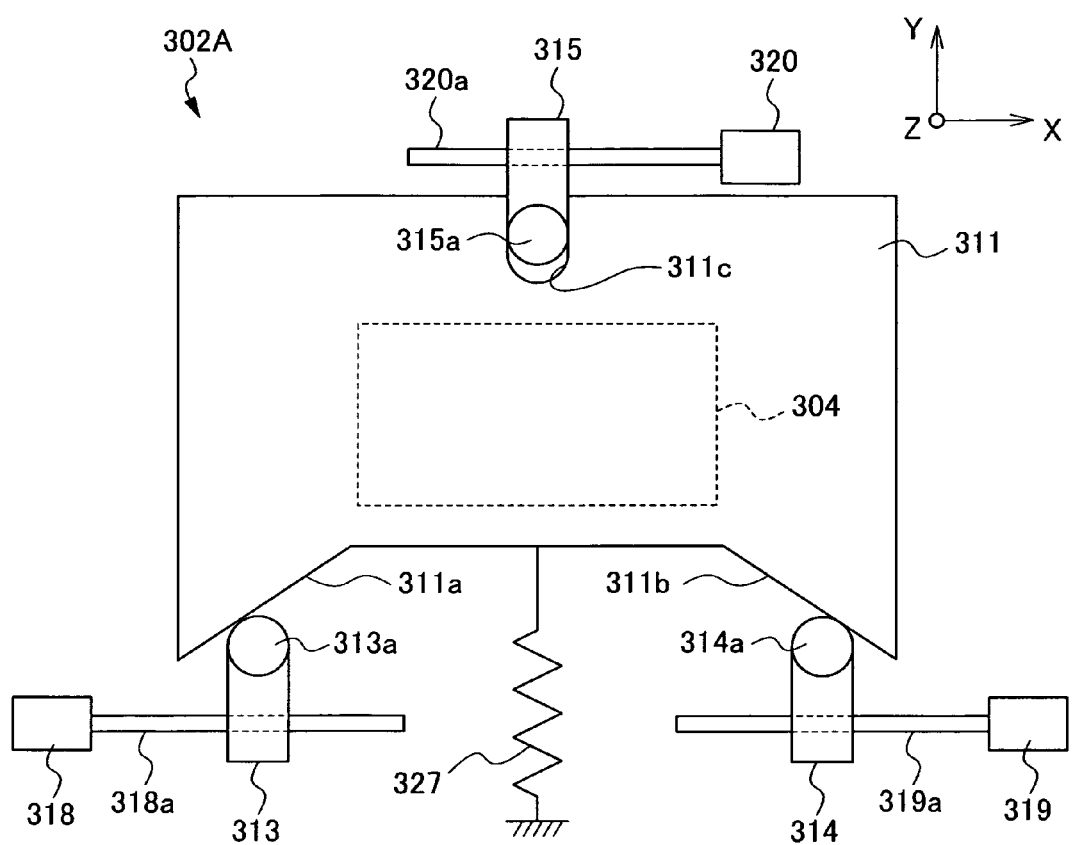
FIG. 21 is a rear view illustrating a driving mechanism of an alternative mode of the fourth embodiment.

(1) FIG. 21 illustrates a different embodiment of the driving mechanism. In a driving mechanism 302A of this embodiment, the cam surfaces of the movable plate 311 are modified. That is, the cam faces 311a and 311b are formed at inner side portions of the movable plate 311. The first cam face 311a is formed as a down-leftward inclined face at the left side (the −X side) of the movable plate 311, and the second cam face 311b is formed as a down-rightward inclined face at the right side (the +X side) of the movable plate 311. Similarly to FIG. 16, the first slider 313 and the second slider 314 abut against the cam faces 311a and 311b. Hence, movements in the X-axis and Y-axis directions of the movable plate 311 are possible and turning about the optical axis (Z axis) is possible.

(2) In the fourth embodiment, the cam faces 311a and 311b including the inclined faces are formed at left and right outer faces of the movable plate 311, but this is not to be limiting. Slits that are inclined similarly to the cam faces 311a and 311b may be formed at left and right positions of the movable plate 311, the pins 313a and 314a of the sliders 313 and 314 being slidably inserted into these slits, and movements and turning of the movable plate 311 carried out therewith.

(3) The fourth embodiment has been described using an imaging device that moves the imaging unit 304 to perform vibration reduction, but this is not to be limiting. For example, an imaging device is possible that moves a vibration reduction lens to perform vibration reduction.

(4) In the fourth embodiment, piezoelectric actuators are employed as the actuators 318, 319 and 320. However, this is not to be limiting, and linear motors may be employed.

(5) Turning members such as rollers may be employed as the pins provided at the sliders, and thus friction may be reduced.

(6) A spring other than a tension spring may be employed as the urging spring 327, provided the spring urges the movable plate 311 in the Y direction.

(7) In the fourth embodiment, application to a camera is illustrated, but this is not to be limiting. The optical equipment may be other optical equipment such as a mobile phone equipped with an imaging function or the like.

Fifth Embodiment

Next, a driving mechanism 402 relating to a fifth embodiment is described. In the following descriptions, portions that are the same as in the first embodiment are assigned the same reference numerals, and descriptions thereof are not given. FIG. 1 is also an overall block diagram of a camera 400 of the fifth embodiment.

Figure 22:
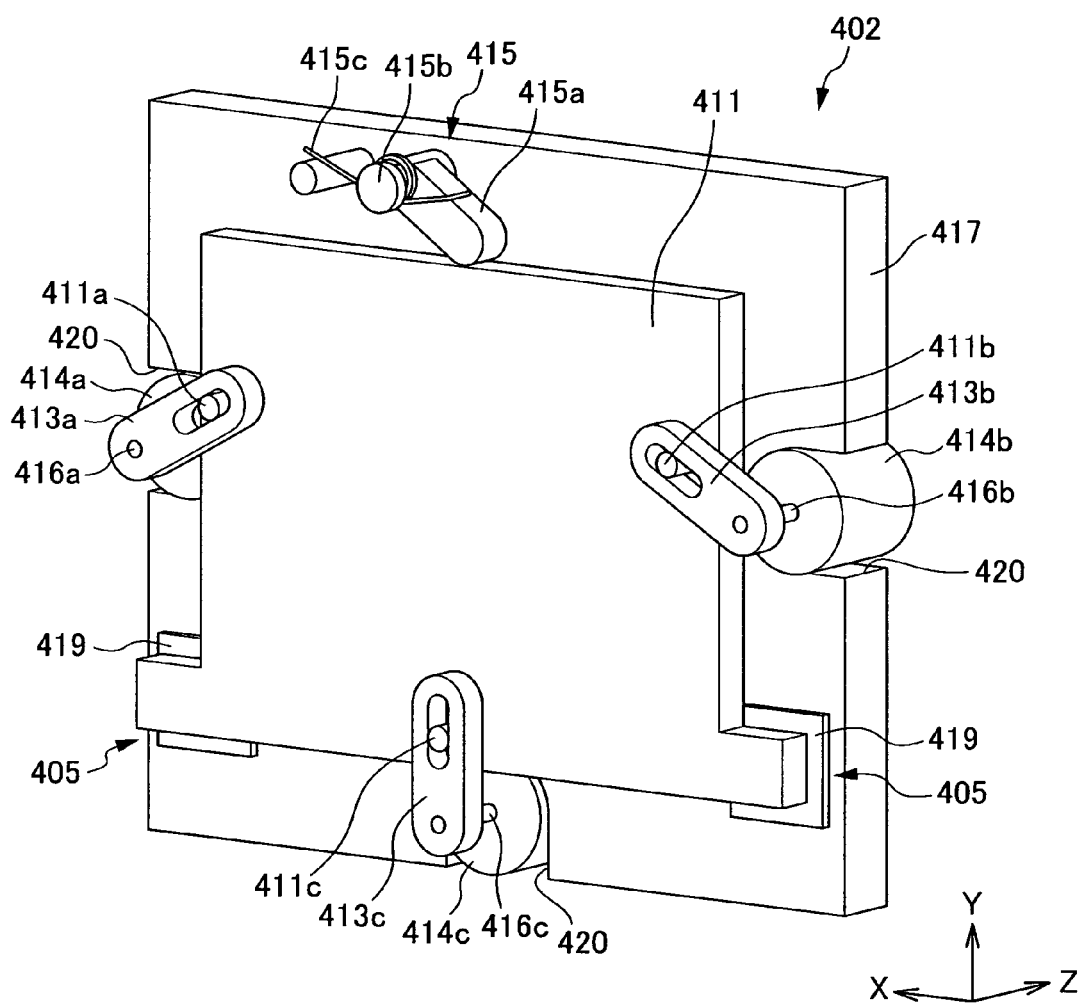
FIG. 22 is a perspective view from the rear side of a driving mechanism of a fifth embodiment.
Figure 23:
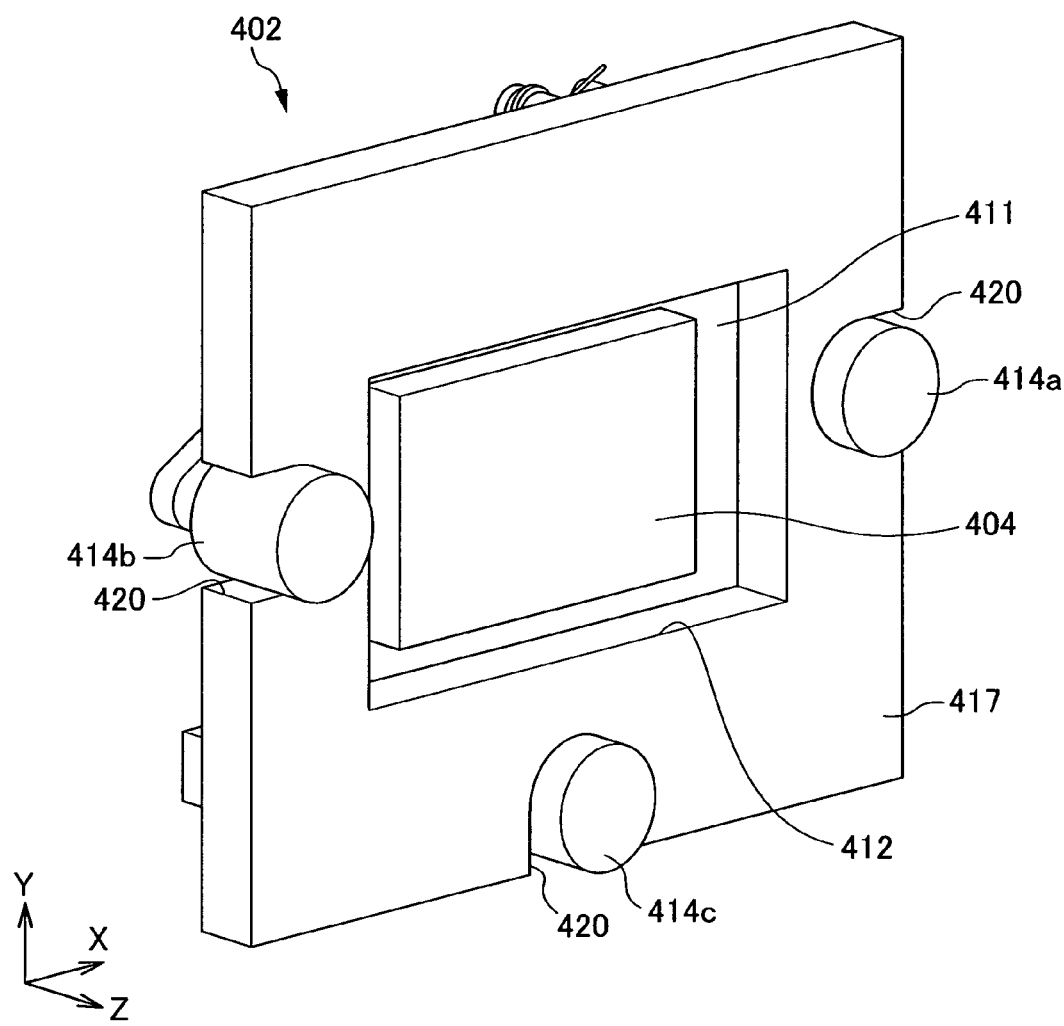
FIG. 23 is a perspective view from the front side of the driving mechanism of the fifth embodiment.

As shown in FIG. 22 and FIG. 23, the driving mechanism 402 includes a movable plate 411, at a substantially central portion of a plate surface of which an imaging unit 404 is disposed. A fixed plate 417 is fixed to the camera body 10 illustrated in FIG. 1. The movable plate 411 is retained to be movable in the X-axis and Y-axis directions relative to the fixed plate 417 in the X-Y plane, which is the plane orthogonal to the optical axis Z, and to be turnable about the optical axis Z.

As shown in FIG. 23, an opening portion 412 with an opening area greater than the profile of the imaging unit 404 is formed in the fixed plate 417. Thus, object light that is incident through the optical lens unit 52 illustrated in FIG. 1 is not impeded from being incident on the imaging face of the imaging unit 404. The opening area of the opening portion 412 formed in the fixed plate 417 should be significantly larger than the profile of the imaging unit 404 in order to allow the imaging unit 404 to move in the X-axis and Y-axis directions and turn in accordance with vibration reduction operations.

A set of two position sensors 405 is mounted between the fixed plate 417 and the movable plate 411. Thus, it is possible to detect relative positions of the movable plate 411 in the X-axis and Y-axis directions with respect to the fixed plate 417 and to detect turning of the movable plate 411 about the optical axis, namely rolling vibrations. Combinations of magnets 419 and Hall devices (not shown) opposing the magnets 419, or other sensors, may be employed as the position sensors 405.

The movable plate 411 is formed in a substantially rectangular shape, a long direction thereof matching the X axis and a short direction thereof matching the Y axis. The −Y direction end portion of the movable plate 411 is broadened a little in the X direction, and the Hall devices are disposed at the broadened positions.

Three pin protrusions 411a, 411b and 411c are formed at the rear face of the movable plate 411. The pin protrusions 411a, 411b and 411c are formed at outer periphery regions of the left and right short edges of the movable plate 411 and an outer periphery region of the long edge at the lower side (the −Y side) of the movable plate 411. The pin protrusion 411a is a first pin protrusion, the pin protrusion 411b is a second pin protrusion and the pin protrusion 411c is a third pin protrusion. The first pin protrusion 411a and the second pin protrusion 411b are disposed somewhat to the upper side (the +Y side) of height direction central portions of the left and right short edges. The third pin protrusion 411c is disposed substantially at the central portion of the lower long side.

A first driving motor 414a, a second driving motor 414b and a third driving motor 414c are disposed so as to correspond with the first, second and third pin protrusions 411a, 411b and 411c. Each of the driving motors 414a, 414b and 414c is disposed in a state of being inserted into a cutaway portion 420 formed in the fixed plate 417. With this arrangement, an increase in thickness and size or the like of the driving mechanism 402 is avoided. Rotation shafts 416a, 416b and 416c of the driving motors 414a, 414b and 414c are parallel with the Z axis. Stepping motors are employed as these driving motors 414a, 414b and 414c.

The pin protrusions 411a, 411b and 411c are linked with the rotation shafts 416a, 416b and 416c of the driving motors 414a, 414b and 414c by turning arms 413a, 413b and 413c. The first pin protrusion 411a and the rotation shaft 416a are linked by the first turning arm 413a, the second pin protrusion 411b and the rotation shaft 416b are linked by the second turning arm 413b, and the third pin protrusion 411c and the rotation shaft 416c are linked by the third turning arm 413c.

The turning arms 413a, 413b and 413c are formed in round-ended rectangle shapes that extend towards the pin protrusions 411a, 411b and 411c from the rotation shafts 416a, 416b and 416c of the driving motors 414a, 414b and 414c. Insertion holes for the pin protrusions 411a, 411b and 411c are formed as long holes in the turning arms 413a, 413b and 413c. Thus, when the turning arms 413a, 413b and 413c are turned by turning of the rotation shafts 416a, 416b and 416c, the pin protrusions 411a, 411b and 411c can be turned relative to the rotation shafts 416a, 416b and 416c, and the rotation shafts 416a, 416b and 416c can be moved in radial directions with respect to the rotation shafts 416a, 416b and 416c.

In the fifth embodiment, the pin protrusions 411a, 411b and 411c are disposed such that the center of gravity of a triangle that is formed by joining the three pin protrusions 411a, 411b and 411c substantially matches the center of gravity of the movable plate 411. With this arrangement, the movable plate 411 is easier to move.

An urging member 415 is disposed at a portion of the fixed plate 417 that corresponds with the long edge at the upper side (the +Y side) of the movable plate 411. The urging member 415 is provided with an urging arm 415a that abuts against a substantially central portion of the upper side long edge of the movable plate 411, an axial pin 415b that serves as a center of rotation of the urging arm 415a, and a spring (a torsion spring) 415c that urges the urging arm 415a. The spring 415c urges the urging arm 415a so as to continuously push the movable plate 411 downward (in the −Y direction). Thus, looseness of the movable plate 411 is prevented.

In a usual state, in which the driving motors 414a, 414b and 414c have not been driven, the first turning arm 413a and second turning arm 413b at the left and right are inclined diagonally upward. The movable plate 411 is urged downward by the urging member 415, because the movable plate 411 is stopped at a predetermined position in opposition to this urging force. In the usual state, the third turning arm 413c may be in an upright state parallel to the Y axis (see FIG. 24), or may be inclined to left or right.

Figure 24:
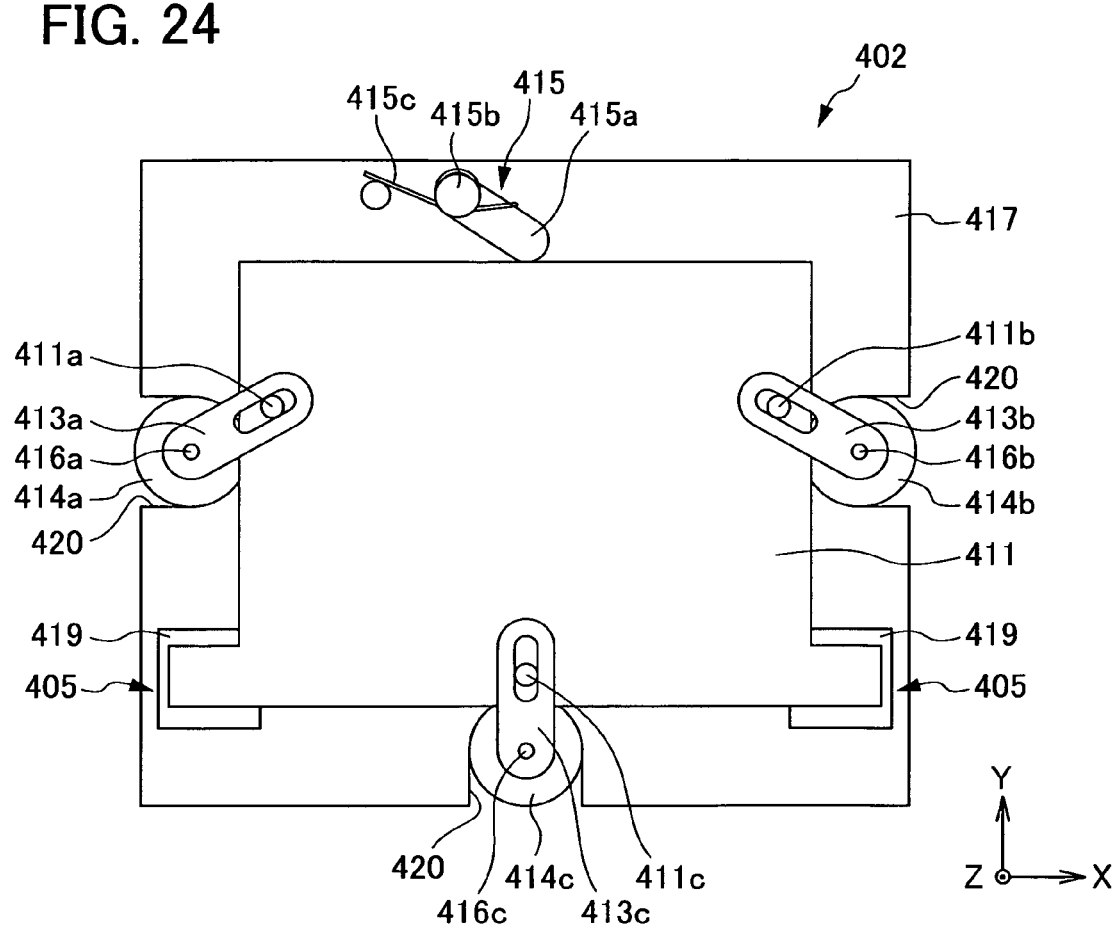
FIG. 24 is a rear view of the driving mechanism of the fifth embodiment.
Figure 25:
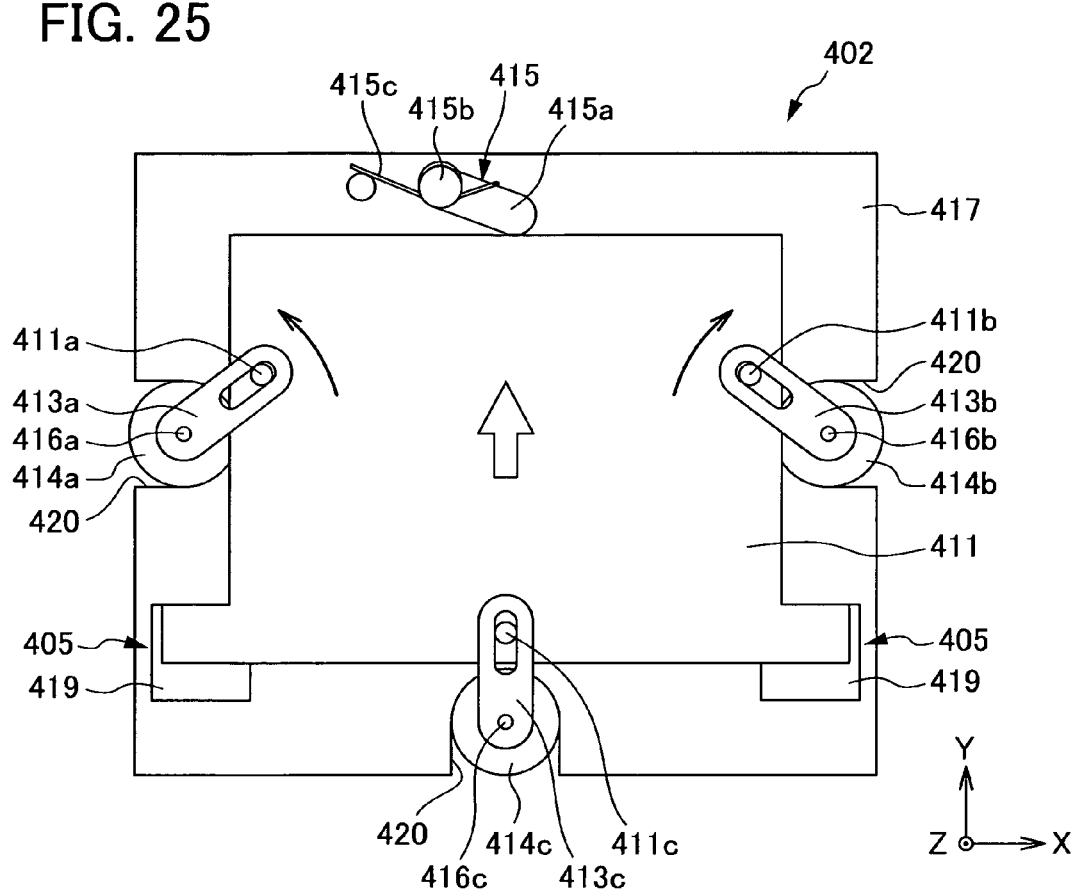
FIG. 25 is a rear view illustrating vibration reduction of the driving mechanism of the fifth embodiment.
Figure 26:
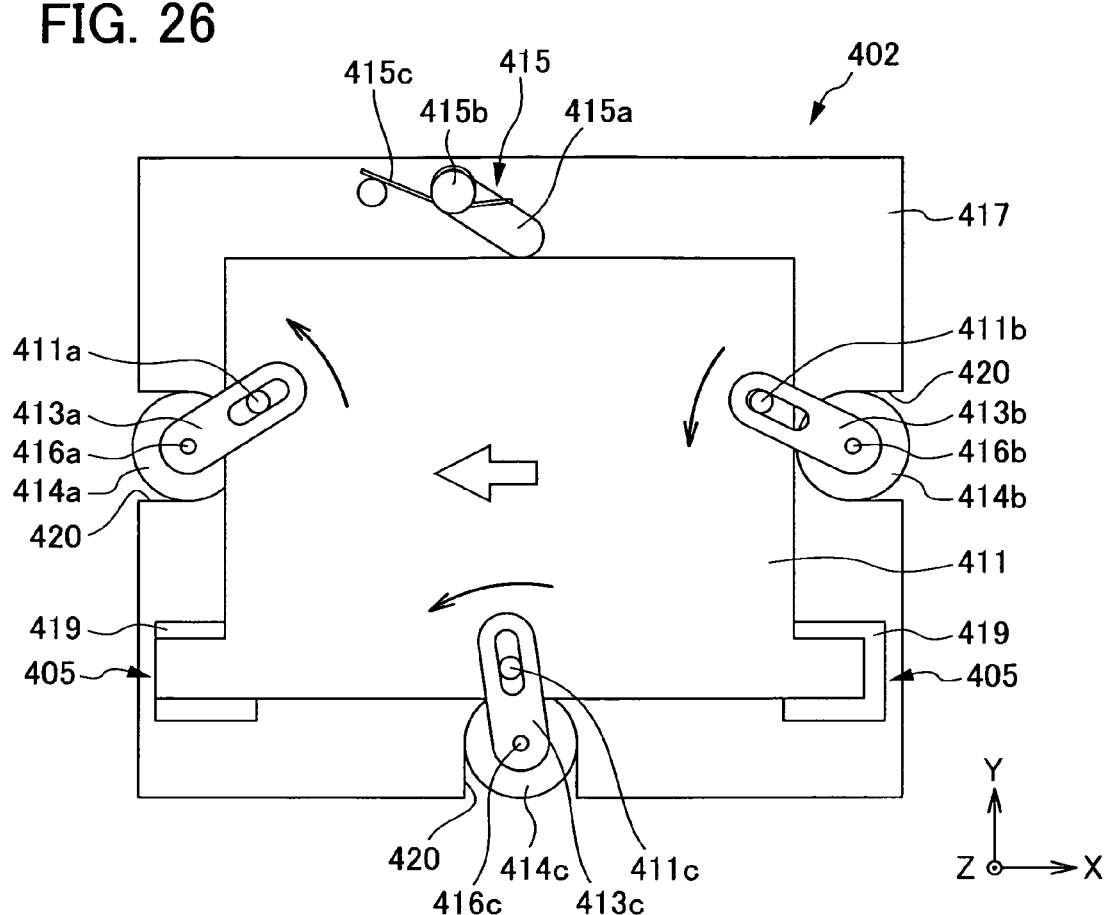
FIG. 26 is a rear view illustrating vibration reduction of the driving mechanism of the fifth embodiment.
Figure 27:
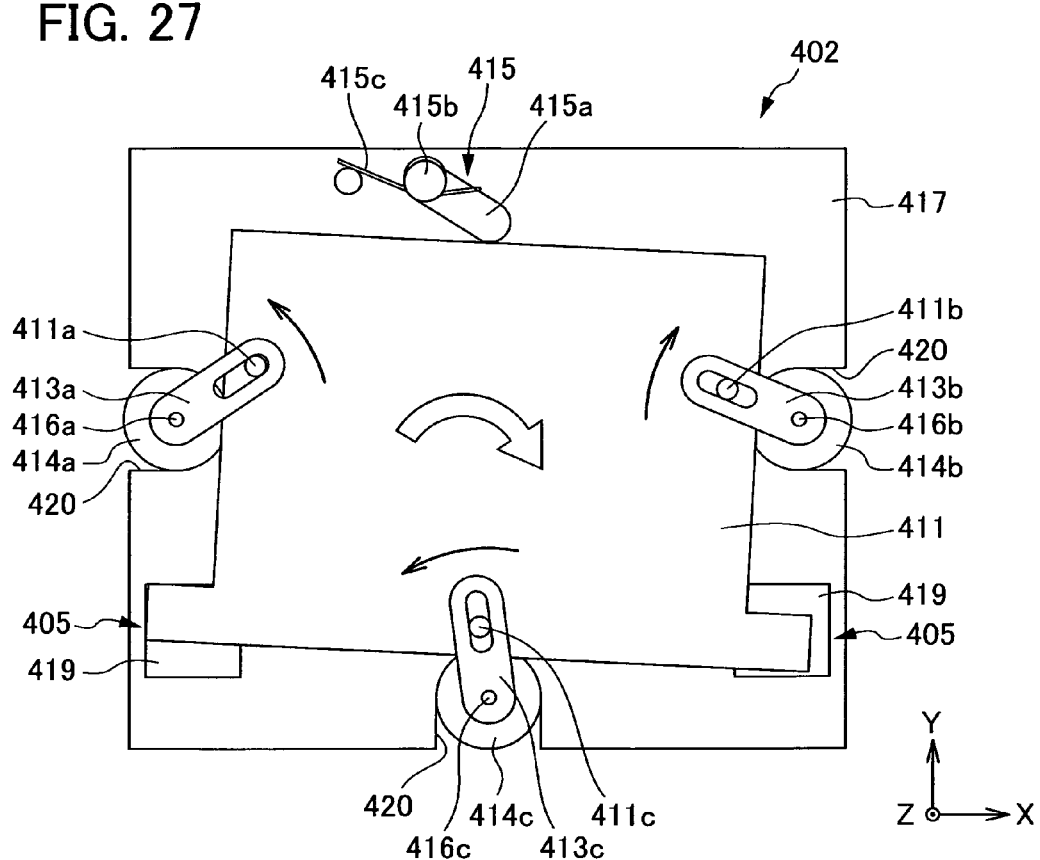
FIG. 27 is a rear view illustrating vibration reduction of the driving mechanism of the fifth embodiment.
Figure 28:
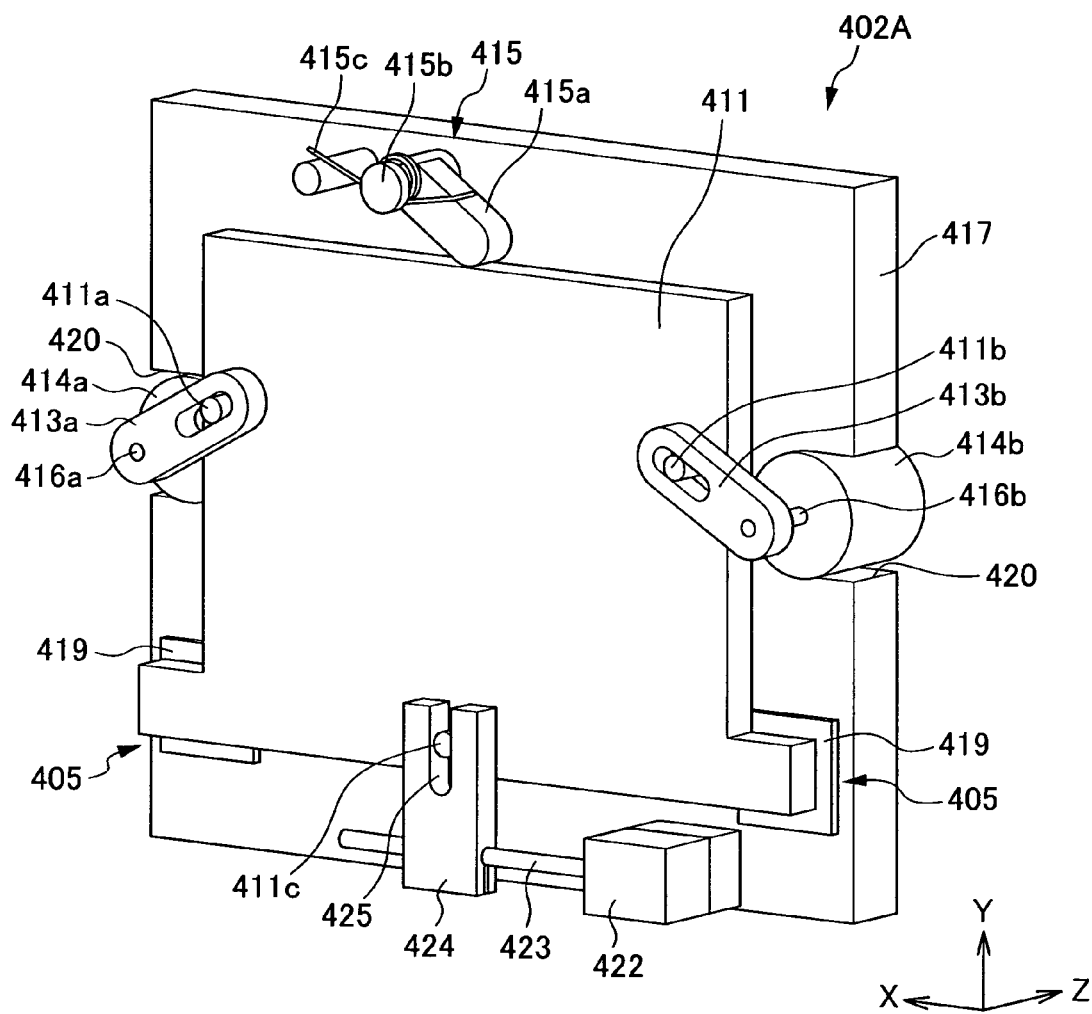
FIG. 28 is a perspective view from the rear side of a driving mechanism of a sixth embodiment.
Figure 29:
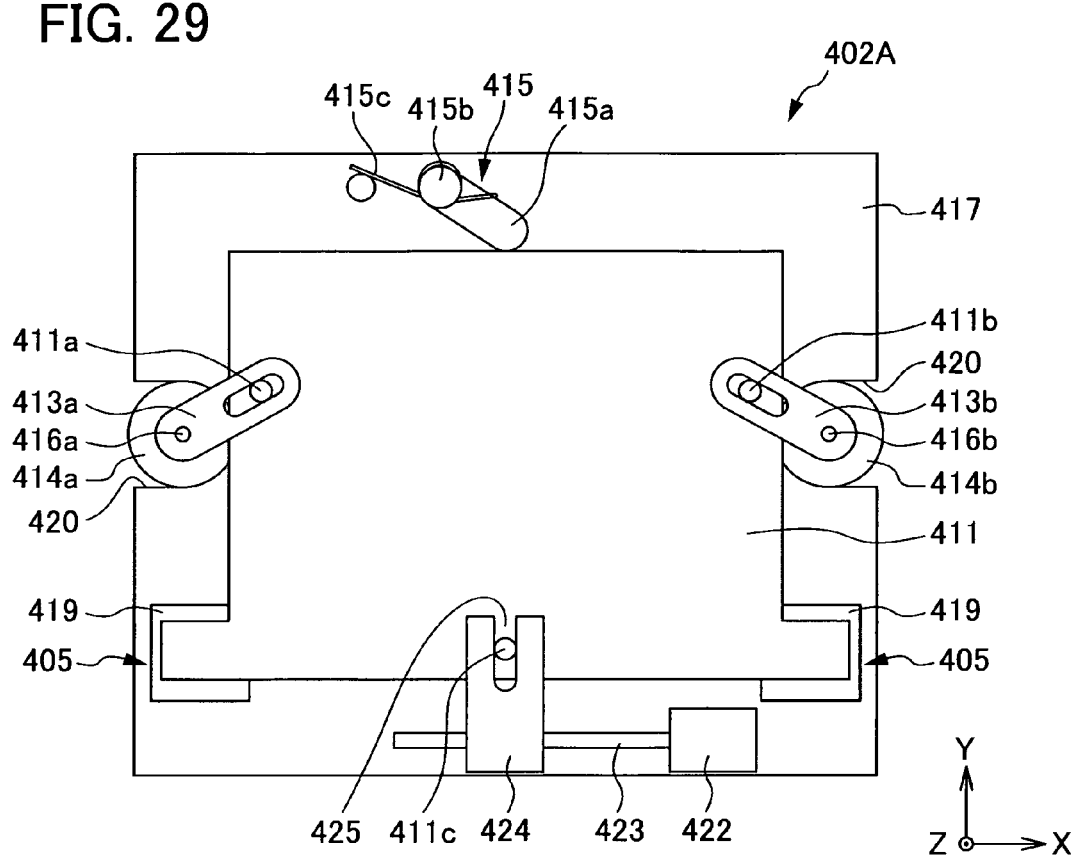
FIG. 29 is a rear view of the driving mechanism of the sixth embodiment.

Next, operation of the fifth embodiment is described. Driving signals are outputted to the driving motors 414a, 414b and 414c from the antivibration driving driver 46 illustrated in FIG. 1, and thus the driving motors 414a, 414b and 414c are respectively separately driven. Driving control of the driving motors 414a, 414b and 414c is implemented by: relative X-Y positions of the imaging unit 404 with respect to the fixed plate 417 and inclinations of the imaging unit 404 with respect to the optical axis are detected on the basis of output signals from the position sensors 405, and the feedback is implemented based on these detection signals. FIG. 24 illustrates a reference state of the movable plate 411. FIG. 25 to FIG. 27 illustrate states in which the movable plate 411 has been moved by driving of the driving motors 414a, 414b and 414c.

FIG. 25 illustrates a state in which the third driving motor 414c is not driven but the first driving motor 414a and the second driving motor 414b at the left and right are driven, the first turning arm 413a being turned anticlockwise and the second turning arm 413b being turned clockwise. The movable plate 411 is shifted upward relative to the fixed plate 417 (in the +Y direction) by this turning. The imaging unit 404 accordingly moves in the same direction. When the movable plate 411 is to be shifted downward (in the −Y direction), this can be done by the opposite operations.

To shift the imaging unit 404 in the X-axis direction, as shown in FIG. 26, the first to third driving motors 414a, 414b and 414c are driven, the first turning arm 413a, second turning arm 413b and third turning arm 413c being turned in the anticlockwise direction. By this turning of the turning arms, the movable plate 411 is moved leftward (in the −X direction). The imaging unit 404 accordingly moves in the same direction. When the movable plate 411 is to be shifted rightward (in the +X direction), this can be done by the opposite operations.

When a rolling shake, which is a turn about the optical axis, is to be corrected, then as shown in FIG. 27, the first to third driving motors 414a, 414b and 414c are driven, the first turning arm 413a being turned anticlockwise, the second turning arm 413b being turned clockwise and the third turning arm 413c being turned anticlockwise. The movable plate 411 is turned in the clockwise direction by this turning, and the imaging unit 404 turns in the same direction. When the movable plate 411 is to be turned in the anticlockwise direction, this can be done by the opposite operations.

According to the fifth embodiment described hereabove, the following effects are present.

(1) The fifth embodiment has a structure in which the movable plate is not formed in two levels but as the single movable plate 411, and vibration reduction is performed by moving and turning the movable plate 411 using the driving motors 414a, 414b and 414c and the turning arms 413a, 413b and 413c. That is, because the single movable plate is controlled to move and turn, loads on the driving system can be reduced and energy savings are possible.

(2) For the same reason, the overall driving mechanism 402 can be made thinner (smaller), and the number of components can be reduced.

(3) Furthermore, because a gear train, a linking mechanism or the like is not necessary, this also means that there may be fewer structural components, lighter weight, and reduced manufacturing costs.

(4) When control of the driving mechanism 402 stops or when the provision of electricity to the driving motors 414a, 414b and 414c stops, the movable plate 411 is in a stopped state thereof. Therefore, in contrast to a conventional constitution in which a movable plate is moved by electromagnetic force, a locking mechanism for fixing the relative position of the movable plate at a time of control stopping, a time of provision of electricity stopping or the like is not required.

(5) Because the movable plate 411 can be turned about the optical axis, correction of rolling vibrations is possible. Therefore, vibration reduction is possible for shaking in all directions. In addition, this embodiment is applicable for correction of rotation of a camera other than correction of rolling vibrations caused by hand wobbling. For example, this embodiment can be applied to correct such an inclination of a camera as detected by an angle sensor contained in the camera.

(6) Because vibration reduction is performed by the turning arms and pin protrusions with simple forms, more stable operations can be assured than in a vibration reduction structure based on cams.

Sixth Embodiment

FIG. 28 to FIG. 32 show a driving mechanism 402A of a sixth embodiment. In the driving mechanism 402A of the sixth embodiment, portions that are the same as in the fifth embodiment are assigned the same reference numerals. In the driving mechanism 402A, the same as in the fifth embodiment, the first driving motor 414a and second driving motor 414b are disposed at the left and right of the movable plate 411. The rotation shafts 416a and 416b of the driving motors 414a and 414b are linked with the pin protrusions 411a and 411b at the left and right of the movable plate 411 by the first turning arm 413a and the second turning arm 413b. Thus, driving force of the driving motors 414a and 414b is transmitted to the movable plate 411 via the turning arms 413a and 413b. Stepping motors are employed as the driving motors 414a and 414b.

The difference between the sixth embodiment and the fifth embodiment is that a piezoelectric actuator 422 and a slider 424 are disposed at the lower side (the −Y side) of the movable plate 411 instead of a driving motor and an arm. Driving of the piezoelectric actuator 422 is controlled by the antivibration driving driver 46, the same as for the driving motors 414a and 414b.

The piezoelectric actuator 422 is provided with a shaft 423, diameter and length of which are altered by the input of control signals. The shaft 23 extends in the +X direction from the piezoelectric actuator 422, parallel with the X axis.

A slit 425 extending in the X-axis direction, an end of which is open, is formed in the slider 424. The third pin protrusion 411c of the movable plate 411 is inserted into the slit 425. Thus, the slider 424 and the movable plate 411 are engaged. The slider 424 extends toward the fixed plate 417 (to the −Y side), and the shaft 423 passes through this extended portion. The slider 424 moves linearly along the shaft 423 when the diameter, length or the like of the shaft 423 alters. In this constitution, the slider 424 and the piezoelectric actuator 422 are linked by the shaft 423. Thus, the movable plate 411 and the piezoelectric actuator 422 are linked via the slider 424.

Figure 30:
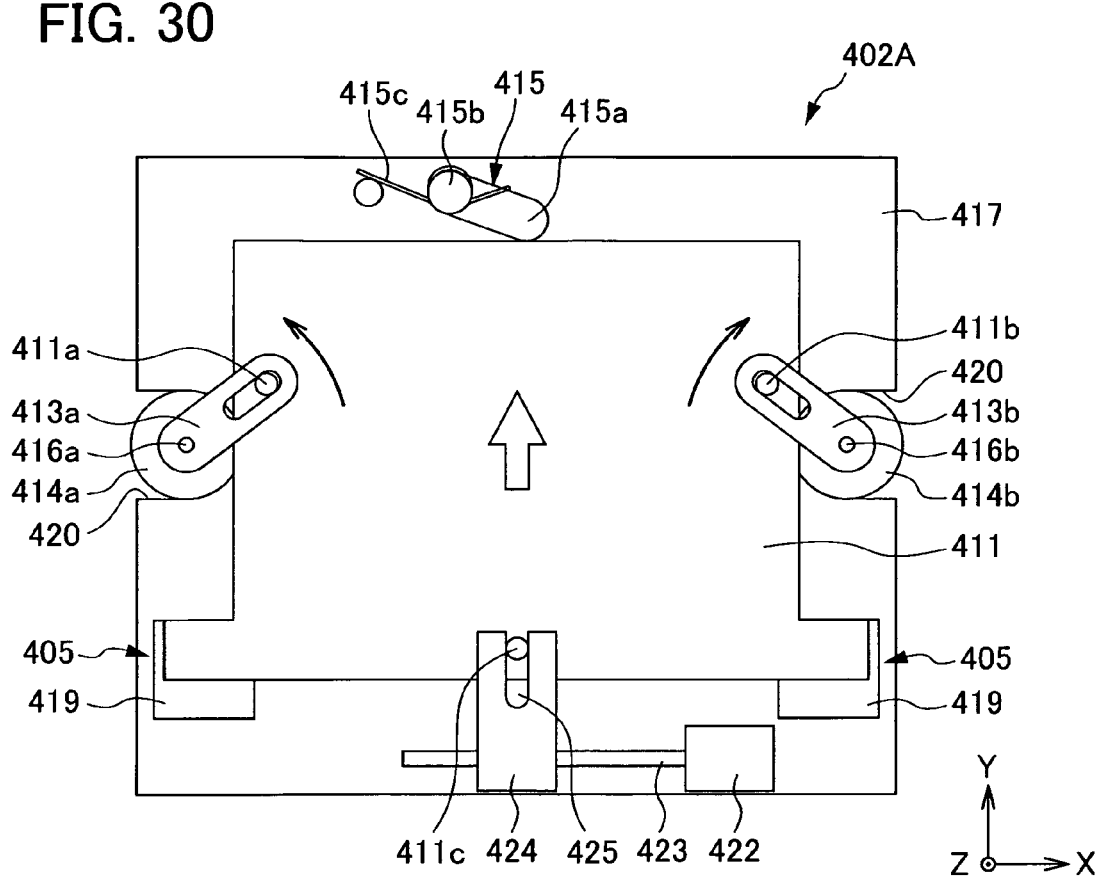
FIG. 30 is a rear view illustrating vibration reduction of the driving mechanism of the sixth embodiment.

In the sixth embodiment, driving signals are inputted to the first driving motor 414a and the second driving motor 414b from the antivibration driving driver 46, and the motors 414a and 414b are driven. As shown in FIG. 30, the first turning arm 413a is turned in the anticlockwise direction and the second turning arm 413b is turned in the clockwise direction by this driving. At this time, driving signals are not inputted to the piezoelectric actuator 422, and the piezoelectric actuator 422 is left stopped. When the first turning arm 413a and the second turning arm 413b turn as described above, the movable plate 411 is shifted upward (in the +Y direction). The imaging unit 404 accordingly moves in the same direction. When the movable plate 411 is to be shifted downward (in the −Y direction), this can be done by the opposite operations.

Figure 31:
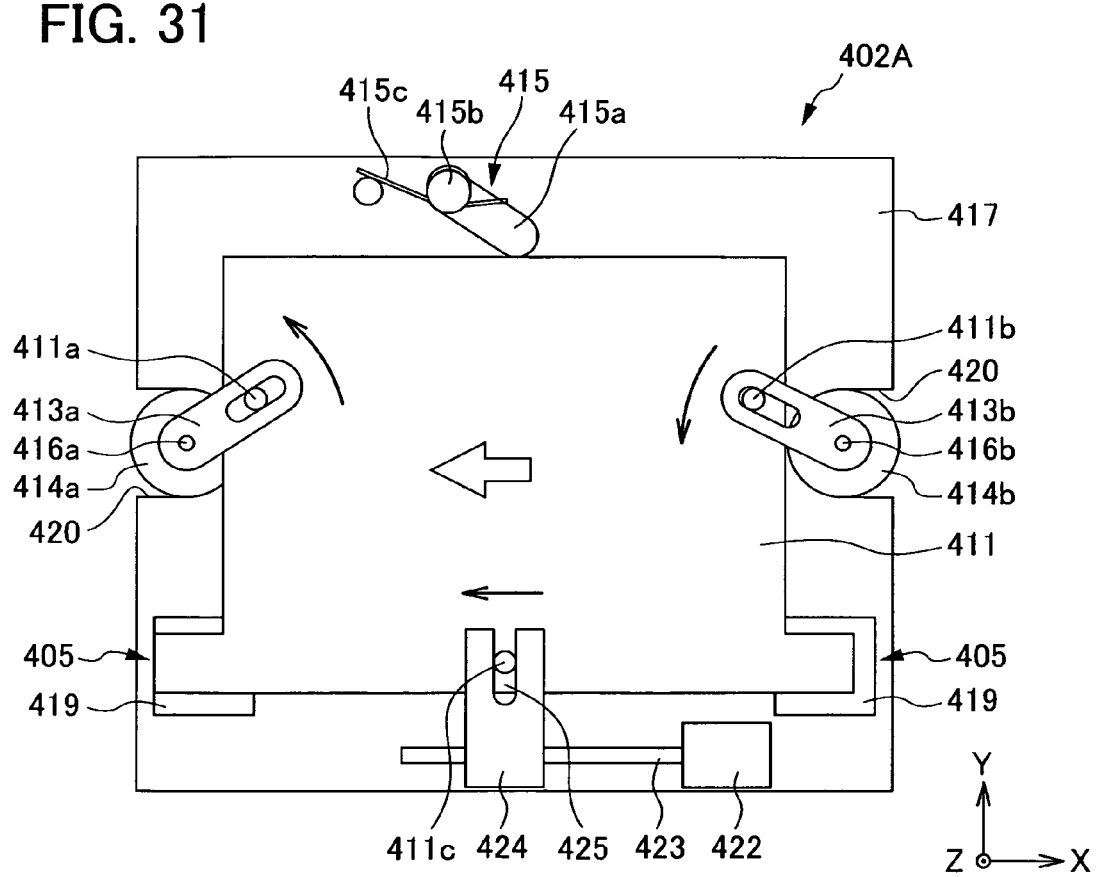
FIG. 31 is a rear view illustrating vibration reduction of the driving mechanism of the sixth embodiment.

To shift the imaging unit 404 in the X-axis direction, driving signals are outputted to the first driving motor 414a, the second driving motor 414b and the piezoelectric actuator 422. In this case, as shown in FIG. 31, the driving motors 414a and 414b are driven such that the first turning arm 413a turns anticlockwise and the second turning arm 413b also turns anticlockwise. Additionally, the piezoelectric actuator 422 is driven such that the slider 424 moves linearly in the −X direction. Thus, the movable plate 411 is moved leftward (in the −X direction). The imaging unit 404 accordingly moves in the same direction. When the movable plate 411 is to be shifted rightward (in the +X direction), this can be done by the opposite operations.

Figure 32:
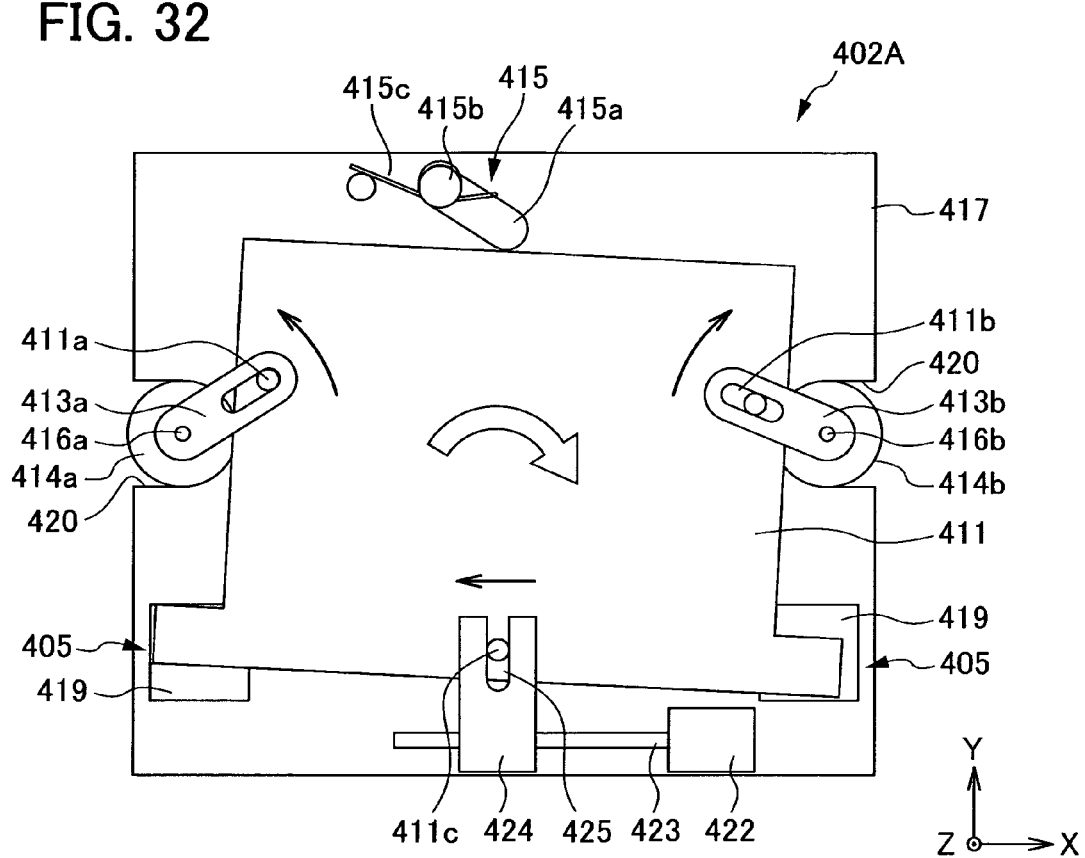
FIG. 32 is a rear view illustrating vibration reduction of the driving mechanism of the sixth embodiment.
Figure 33:
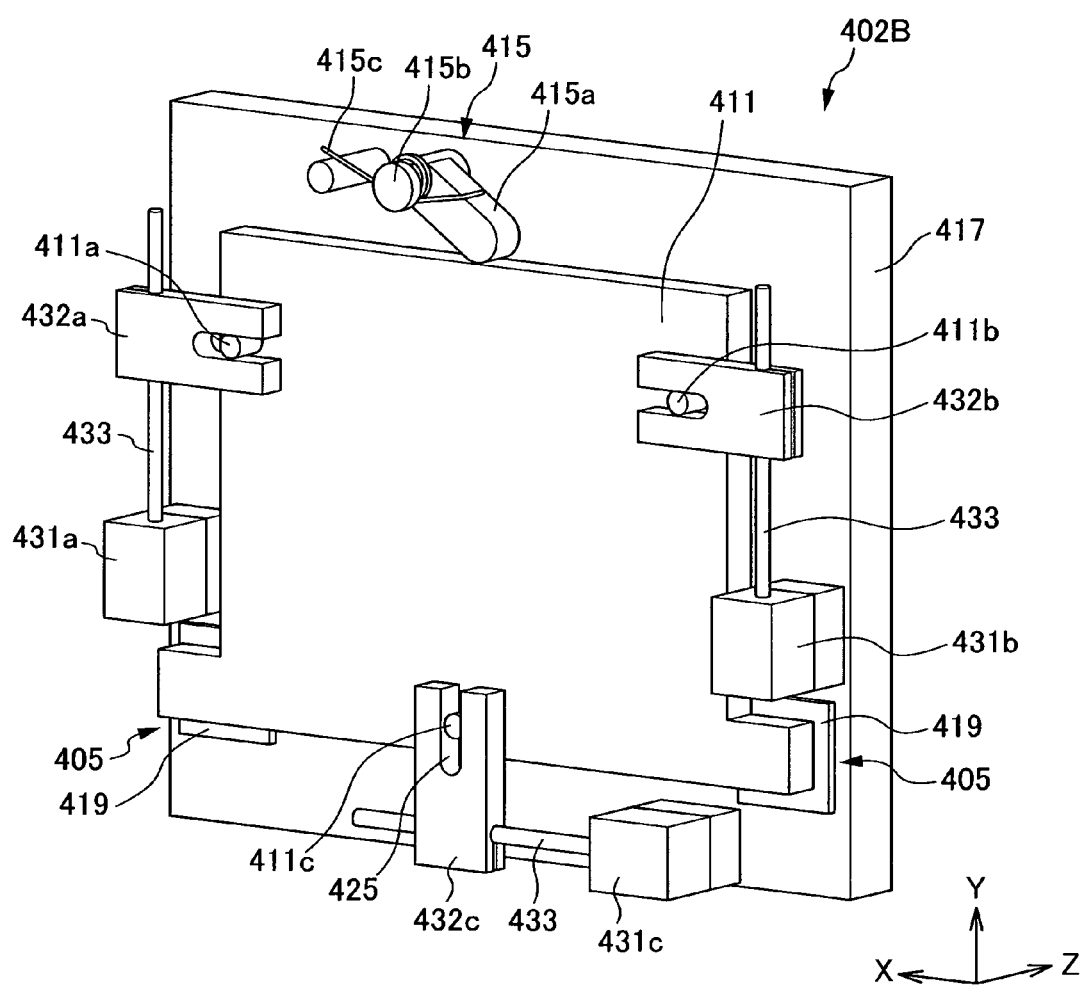
FIG. 33 is a perspective view from the rear side of a seventh embodiment.
Figure 34:
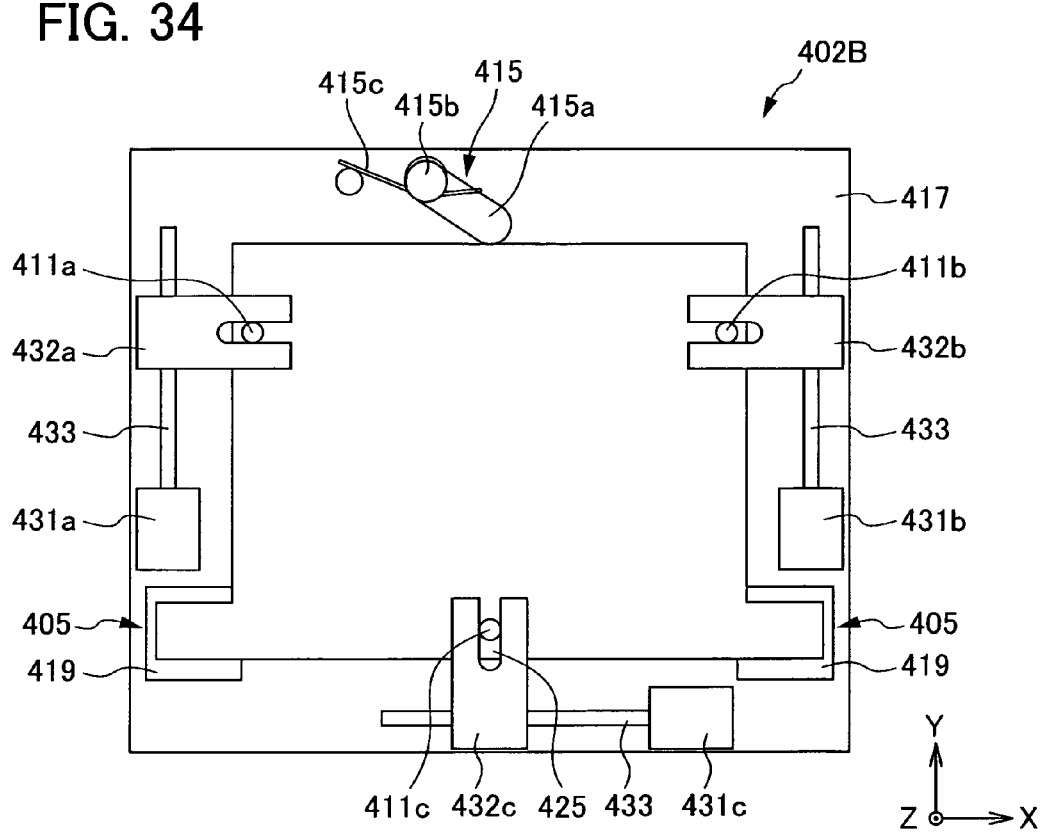
FIG. 34 is a rear view of a driving mechanism of the seventh embodiment.

When a rolling shake is to be corrected, driving signals are outputted to the first driving motor 414a, the second driving motor 414b and the piezoelectric actuator 422. As shown in FIG. 32, the driving motors 414a and 414b are driven such that the first turning arm 413a turns anticlockwise while the second turning arm 413b turns clockwise. Additionally, the piezoelectric actuator 422 is driven such that the slider 424 moves linearly in the −X direction. Thus, the movable plate 411 is turned in the clockwise direction, and the imaging unit 404 turns in the same direction. When the movable plate 411 is to be turned in the anticlockwise direction, this can be done by the opposite operations.

In the sixth embodiment, the same as in the fifth embodiment, the single movable plate is controlled to move and rotate. Therefore, a thinner form is possible, in addition to which loads on the driving system can be reduced and therefore energy savings are possible. Furthermore, because the movable plate 411 is turned about the optical axis to perform vibration reduction, corrections of rolling shake are possible, and vibration reduction is possible for shaking in all directions. In addition, this embodiment is applicable for correction of rotation of a camera other than correction of rolling vibrations caused by hand wobbling. For example, this embodiment can be applied to correct such an inclination of a camera as detected by an angle sensor contained in the camera.

Seventh Embodiment

FIG. 33 to FIG. 37 show a driving mechanism 402B of a seventh embodiment. In the seventh embodiment too, portions that are the same as in the fifth embodiment are assigned the same reference numerals as in the fifth embodiment. In the seventh embodiment, piezoelectric actuators 431a, 431b and 431c are disposed at the left and right (X) short edges and the lower (−Y side) long edge of the movable plate 411. The first piezoelectric actuator 431a is disposed at the rear face of the fixed plate 417 so as to correspond with the left side (+X side) short edge, the second piezoelectric actuator 431b is disposed at the rear face of the fixed plate 417 so as to correspond with the right side (−X side) short edge, and the third piezoelectric actuator 431c is disposed at the rear face of the fixed plate 417 so as to correspond with the lower side (−Y side) long edge.

The piezoelectric actuators 431a, 431b and 431c are provided with respective shafts 433. The shafts 433 of the first piezoelectric actuator 431a and the second piezoelectric actuator 431b extend in the vertical direction (the Y-axis direction), and the shaft 433 of the third piezoelectric actuator 431c extends in the left-right direction (the X-axis direction). Diameters and lengths of the respective shafts 433 are altered by the input of control signals.

The shafts 433 of the piezoelectric actuators 431a, 431b and 431c pass through sliders 432a, 432b and 432c, respectively. The sliders 432a, 432b and 432c are moved linearly along the shafts 433 by diameter and length or the like of the corresponding shafts 433 being altered. The pin protrusions 411a, 411b and 411c of the movable plate 411 are inserted into and engaged with the sliders 432a, 432b and 432c, respectively. Thus, the pin protrusions 411a, 411b and 411c of the movable plate 411 are linked with the respective shafts 433 of the piezoelectric actuators 431a, 431b and 431c via the sliders 432a, 432b and 432c.

Figure 35:
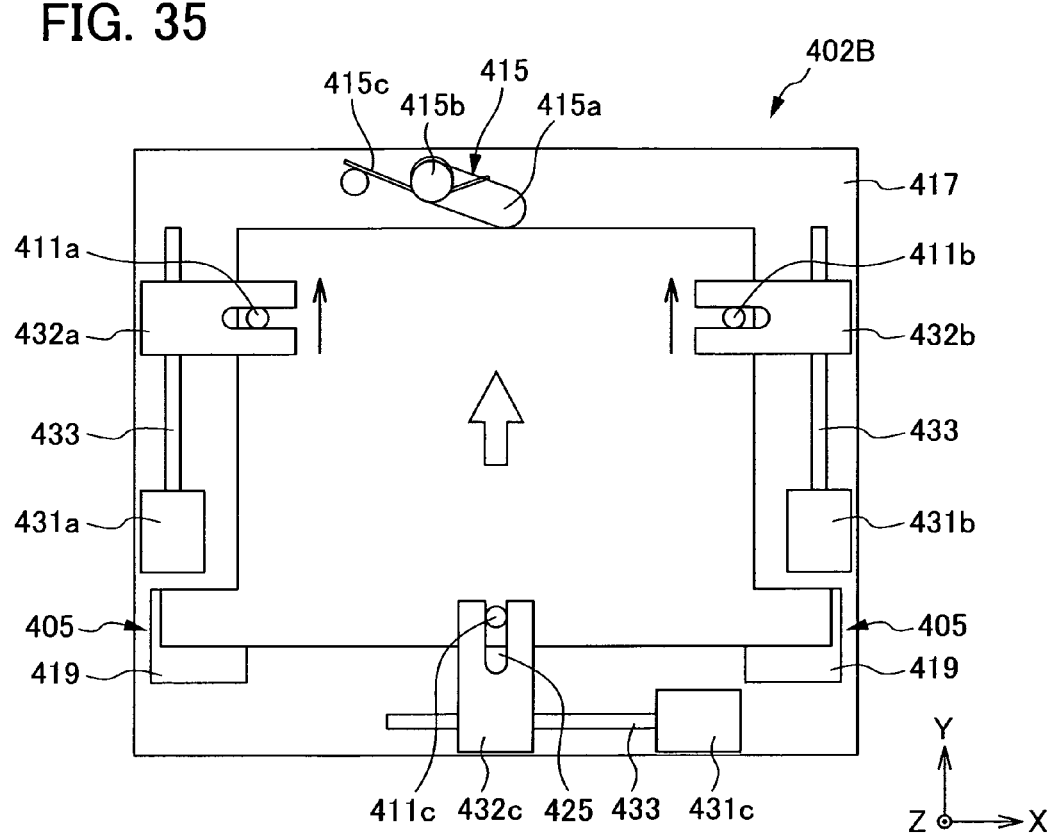
FIG. 35 is a rear view illustrating vibration reduction of the driving mechanism of the seventh embodiment.

FIG. 35 illustrates an operation in which the movable plate 411 including the imaging unit 404 is shifted upward (in the +Y direction). Driving signals are inputted to the first piezoelectric actuator 431a and the second piezoelectric actuator 431b from the antivibration driving driver 46. Thus, the sliders 432a and 432b of the piezoelectric actuators 431a and 431b are moved linearly in the +Y direction. Accordingly, the movable plate 411 can be moved upward. At this time, the third piezoelectric actuator 431c is left stopped. When the movable plate 411 is to be shifted downward, this can be done by the opposite operations.

Figure 36:
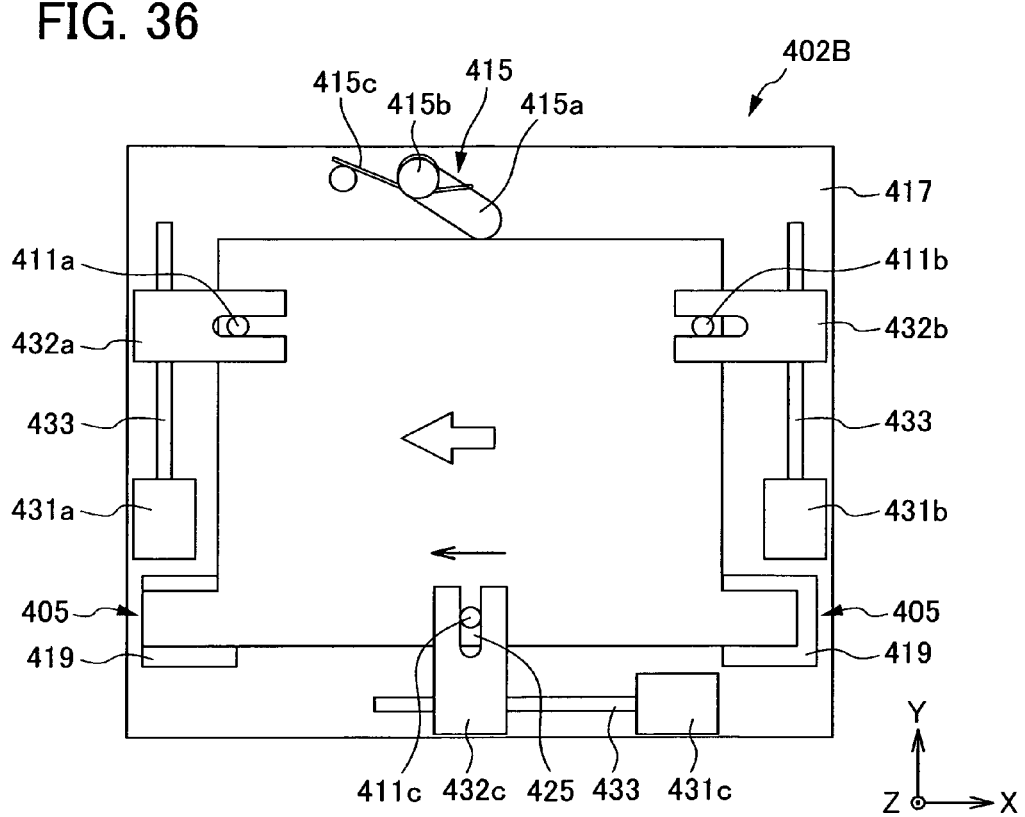
FIG. 36 is a rear view illustrating vibration reduction of the driving mechanism of the seventh embodiment.
Figure 37:
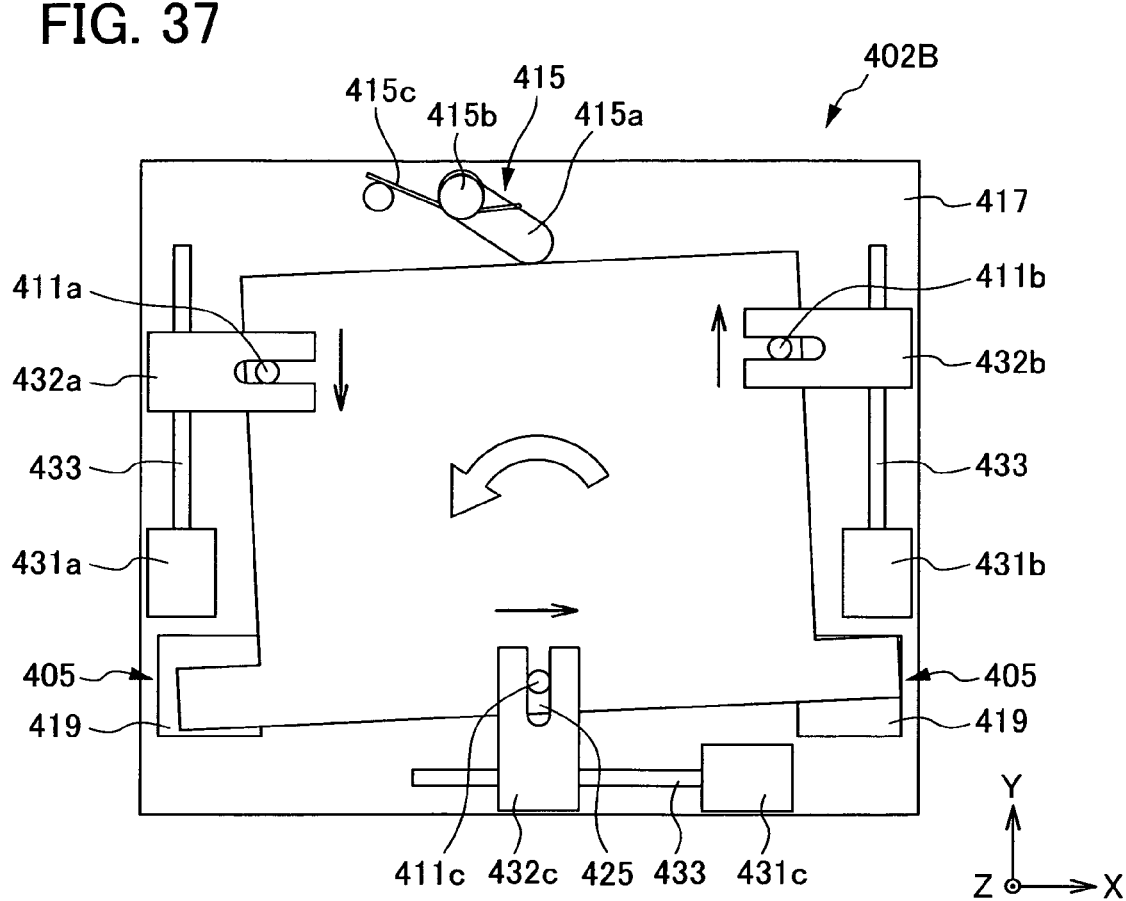
FIG. 37 is a rear view illustrating vibration reduction of the driving mechanism of the seventh embodiment.

To shift the imaging unit 404 in the X-axis direction, as shown in FIG. 36, the first and second piezoelectric actuators 431a and 431b are left stopped and the third piezoelectric actuator 431c is driven. The shaft 433 of the third piezoelectric actuator 431c moves the third slider 432c passing therethrough to leftward (in the −X direction). Therefore, the movable plate 411 moves in the same direction. When the movable plate 411 is to be shifted rightward (in the +X direction), this can be done by the opposite operation.

When a rolling shake is to be corrected, driving signals are inputted to the three piezoelectric actuators 431a, 431b and 431c. The slider 432a at the first piezoelectric actuator 431a is driven so as to move linearly downward (in the −Y direction), the slider 432b at the second piezoelectric actuator 431b is driven so as to move linearly upward (in the +Y direction), and the slider 432c at the third piezoelectric actuator 431c is driven so as to move rightward (in the +X direction). The movable plate 411 is turned in the anticlockwise direction by this combination of linear movements, and the imaging unit 404 turns in the same direction. When the movable plate 411 is to be turned in the clockwise direction, this can be done by the opposite operations.

In the operations described above, the urging arm 415a pushes against the movable plate 411 and suppresses looseness. Therefore, the movable plate 411 can maintain a state of stability in any position.

In this embodiment too, the single movable plate alone is controlled to move and rotate. Therefore, a thinner form is possible, in addition to which loads on the driving system can be reduced and therefore energy savings are possible. Furthermore, because the movable plate 411 is turned about the optical axis to perform vibration reduction, corrections of rolling shake are possible, and vibration reduction is possible for shaking in all directions other than the optical axis direction. In addition, this embodiment is applicable for correction of rotation of a camera other than correction of rolling vibrations caused by hand wobbling. For example, this embodiment can be applied to correct such an inclination of a camera as detected by an angle sensor contained in the camera.

Alternative Modes of the Fifth to Seventh Embodiments

The embodiments described above are not to be limiting. Many modifications and alterations such as illustrated below are possible, and these are also within the technical scope of the present invention.

(1) In the present embodiments, the relative X-Y position of the imaging unit 404 with respect to the fixed plate 417 is detected using the position sensors 405 that are constituted with Hall devices and magnets or the like. However, rather than employing the position sensors 405, relative positions may be calculated from the driving signals that are inputted to the stepping motors, piezoelectric actuators or the like that move the movable plate 411, or from data of rotation amounts, movement amounts or the like.

(2) The above embodiments describe using an imaging device that moves the imaging unit 404 and performs vibration reduction, but this is not to be limiting. For example, an imaging device is possible that moves a vibration reduction lens to perform vibration reduction.

(3) In the embodiments described above, a tension spring may be employed to push the movable plate 411 instead of the torsion spring 415.

(4) In the embodiments described above, application to a camera is illustrated, but this is not to be limiting. The optical equipment may be other optical equipment such as a mobile phone equipped with an imaging function or the like.

The embodiments and alternative modes may be suitably combined and employed, but detailed descriptions are not given here. The present invention is not to be limited by the embodiments described hereabove.

What is claimed is:

1. A driving mechanism of an imaging element, comprising:
    a fixed member;
    a moving member at which the imaging element is mounted and that is movable relative to the fixed member;
    a first driving member that is movable in a first direction, the first driving member being a separate member with respect to the fixed member;
    a second driving member that is movable in the first direction, the second driving member being movable independently of the first driving member, the second driving member being a separate member with respect to the fixed member;
    a third driving member that is movable in the first direction, the third driving member being movable independently of the first driving member and the second driving member;
    a fourth driving member that is movable in the first direction, the fourth driving member being movable independently of the first driving member, the second driving member and the third driving member;
    a first abutting portion that is provided at the moving member and abuts against the first driving member and the second driving member; and
    a second abutting portion that is provided at the moving member and abuts against the third driving member and the fourth driving member, wherein
    the moving member is moved by driving force of the first driving member and the second driving member abutting against the first abutting portion and by driving force of the third driving member and the fourth driving member abutting against the second abutting portion.

2. The driving mechanism according to claim 1, wherein, the first abutting portion and the second abutting portion include pins protruding in a direction orthogonal to a direction in which the moving member moves.

3. The driving mechanism according to claim 1, wherein the first driving member includes a first inclined face that engages with the first abutting portion,
    the second driving member includes a second inclined face that is inclined at a different angle from the first inclined face and engages with the first abutting portion,
    the third driving member includes a third inclined face that engages with the second abutting portion, and
    the fourth driving member includes a fourth inclined face that is inclined at a different angle from the third inclined face and engages with the second abutting portion.

4. The driving mechanism according to claim 3, further comprising
    an urging member that urges the moving member in a second direction which is orthogonal to the first direction, wherein the first inclined face and the second inclined face are inclined at substantially the same angle in opposite directions with respect to the second direction, and the third inclined face and the fourth inclined face are inclined at substantially the same angle in opposite directions with respect to the second direction.

5. The driving mechanism according to claim 4, wherein, an inclination angle of the third inclined face is the same as an inclination angle of the first inclined face, and an inclination angle of the fourth inclined face is the same as an inclination angle of the second inclined face.

6. The driving mechanism according to claim 1, further comprising a guide member that guides movement in the first direction of the first driving member, the second driving member, the third driving member and the fourth driving member relative to the fixed member.

7. The driving mechanism according to claim 1, further comprising a calculation section that calculates a relative movement position of the moving member with respect to a fixed position, from a position of the first driving member, a position of the second driving member, a position of the third driving member and a position of the fourth driving member.

8. Optical equipment comprising the driving mechanism according to claim 1.

\* \* \* \* \*